United States Patent
Hakiri et al.

(10) Patent No.: US 8,979,989 B2
(45) Date of Patent: Mar. 17, 2015

(54) INK FOR INKJET RECORDING, INK CARTRIDGE AND INKJET RECORDING APPARATUS

(71) Applicants: Minoru Hakiri, Shizuoka (JP); Mitsuru Naruse, Shizuoka (JP); Masayasu Nonogaki, Shizuoka (JP)

(72) Inventors: Minoru Hakiri, Shizuoka (JP); Mitsuru Naruse, Shizuoka (JP); Masayasu Nonogaki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 2 days.

(21) Appl. No.: 13/937,580

(22) Filed: Jul. 9, 2013

(65) Prior Publication Data
US 2014/0028765 A1    Jan. 30, 2014

(30) Foreign Application Priority Data

Jul. 25, 2012  (JP) .................................. 2012-164906

(51) Int. Cl.
| | | |
|---|---|---|
| C09D 11/02 | (2014.01) | |
| G01D 11/00 | (2006.01) | |
| C09D 11/324 | (2014.01) | |
| C09D 11/40 | (2014.01) | |
| C09D 11/00 | (2014.01) | |

(52) U.S. Cl.
CPC .............. C09D 11/324 (2013.01); C09D 11/40 (2013.01); C09D 11/00 (2013.01)
USPC ................... 106/31.86; 106/31.6; 106/31.65; 106/31.89; 347/100

(58) Field of Classification Search
USPC ......... 106/31.6, 31.65, 31.86, 31.89; 347/100
See application file for complete search history.

(56) References Cited

U.S. PATENT DOCUMENTS

| | | |
|---|---|---|
| 7,101,919 B2 | 9/2006 | Hasegawa et al. |
| 7,798,629 B2 | 9/2010 | Hakiri et al. |
| 8,197,049 B2 | 6/2012 | Hakiri et al. |
| 8,247,473 B2 | 8/2012 | Naruse et al. |
| 2002/0006982 A1 | 1/2002 | Kurabayashi |
| 2003/0196571 A1 | 10/2003 | Hakiri et al. |
| 2006/0209149 A1 | 9/2006 | Hasegawa et al. |
| 2006/0272543 A1 | 12/2006 | Hakiri et al. |
| 2008/0036830 A1 | 2/2008 | Natori et al. |
| 2009/0234065 A1* | 9/2009 | Sasada .......................... 524/558 |
| 2010/0147187 A1* | 6/2010 | Tauber et al. ................ 106/31.9 |
| 2010/0277548 A1 | 11/2010 | Hakiri et al. |

(Continued)

FOREIGN PATENT DOCUMENTS

| | | |
|---|---|---|
| JP | 11-343439 | 12/1999 |
| JP | 2000-319572 | 11/2000 |

(Continued)

OTHER PUBLICATIONS

U.S. Appl. No. 13/742,864, filed Jan. 16, 2013.

(Continued)

*Primary Examiner* — Veronica F Faison
(74) *Attorney, Agent, or Firm* — Oblon, McClelland, Maier & Neustadt, L.L.P.

(57) ABSTRACT

An ink for inkjet recording including a pigment, a penetrating agent and water, wherein the pigment includes: an ozone-oxidized carbon black, including carbon black oxidized by ozone and having a volatile matter content of the carbon black of 10% by mass to 20% by mass and a BET specific surface area of 90 m²/g to 150 m²/g; and a resin-coated carbon black, including: carbon black; and a resin present on a surface of the carbon black.

15 Claims, 3 Drawing Sheets

(56) References Cited

U.S. PATENT DOCUMENTS

| | | |
|---|---|---|
| 2010/0302306 A1 | 12/2010 | Hasegawa et al. |
| 2010/0309260 A1 | 12/2010 | Hakiri et al. |
| 2011/0074865 A1 | 3/2011 | Hasegawa et al. |
| 2011/0267398 A1 | 11/2011 | Hakiri et al. |
| 2012/0026237 A1 | 2/2012 | Hakiri et al. |
| 2012/0062646 A1 | 3/2012 | Hasegawa et al. |
| 2012/0092411 A1 | 4/2012 | Hakiri et al. |
| 2012/0154492 A1 | 6/2012 | Hakiri et al. |
| 2012/0242741 A1 | 9/2012 | Hasegawa et al. |
| 2012/0262518 A1 | 10/2012 | Naruse et al. |
| 2013/0147876 A1* | 6/2013 | Hakiri et al. .......... 347/20 |

FOREIGN PATENT DOCUMENTS

| | | |
|---|---|---|
| JP | 2000-319573 | 11/2000 |
| JP | 2004-035718 | 2/2004 |
| JP | 3874538 | 11/2006 |
| JP | 2009-149815 | 7/2009 |
| JP | 4374928 | 9/2009 |
| JP | 2011-080041 | 4/2011 |

OTHER PUBLICATIONS

U.S. Appl. No. 13/826,300, filed Mar. 14, 2013.

* cited by examiner

INK FOR INKJET RECORDING, INK CARTRIDGE AND INKJET RECORDING APPARATUS

BACKGROUND OF THE INVENTION

1. Field of the Invention

The present invention relates to an ink for inkjet recording, an ink cartridge and an inkjet recording apparatus.

2. Description of the Related Art

In recent years, an inkjet recording method has become widespread since it is advantageous in terms of its simple process as an image forming method simple compared to other recording methods, easy full colorization and high-resolution image obtained even with an apparatus having a simple configuration. Such an inkjet recording method forms an image by: flying an ink by bubbles generated by heat or by a pressure generated using a piezo element; depositing it on a recording medium such as paper; and drying (or impregnate into the recording medium), and its application has been expanding to printing using printers for personal use, office use and industrial use.

Recently, there is an increasing demand for industrial use, and it has been desired to adapt to high-speed printing or various recording media. In conjunction with high-speed printing, an inkjet printer equipped with a line head has also become necessary.

Also, there is an increasing demand for an aqueous ink in view of environment and safety. However, the aqueous ink is easily affected by the recording medium, causing various problems to an image. It is particularly significant when non-smooth gloss paper is used as a recording medium.

The water-based ink requires time for drying. It is highly compatible with paper and thus has high penetrability into paper. In case of uncoated, non-smooth plain paper, penetration of the colorant into paper decreases a concentration of the colorant, which is a problem that has not arisen with a solvent-based ink.

Meanwhile, in conjunction with high-speed printing, in order to accelerate drying of an ink that has been adhered on a recording medium, a penetrating agent is added to the ink so as to have water as a solvent penetrate into the recording medium. However, incorporation of the penetrating agent in the ink increases penetrability of not only water but also the colorant into the recording medium, which is a problem of decreased image density that is different from an ink used for paint and a ball-point pen.

Also, since a color printer carries out printing by superimposing inks of various colors, namely yellow, magenta, cyan and black, there are problems with a color inkjet recording that inks as liquids are mixed with one another and that the inks flow out. Further, because of demands for high-quality printing, it has been desired to obtain not only a high-definition image having superior color reproducibility by mixing colors with less occurrences of image blurring and feathering on an ink recorded matter as a color image but also sufficiently high-definition recording even for monochrome inkjet recording using only a black ink. However, a technology with satisfactory performance has not yet been provided.

Therefore, for the purpose of improving dispersion stability of a pigment, for example, there is proposed a coated pigment obtained by binding a reactive emulsifier containing an acidic group to a pigment having a dye derivative containing a basic group on a surface thereof and then polymerizing it in the presence of an addition polymerizable monomer (see Japanese Patent (JP-B) No. 4374928).

Also, for the purpose of improving image density, there is proposed an aqueous pigment dispersion having a ratio of a specific surface area of surface-modified carbon black ($m^2$/g)/DBP oil absorption (mL/100 g) of 0.3 to 2.5 and having a hydrophilic functional group introduced on a surface thereof (see Japanese Patent Application Laid-Open (JP-A) No. 2000-319573).

Also, there is proposed an ink having a structure that the ink includes: a resin including a colorant; and a pigment, wherein the resin including the colorant confines the colorant in a microcapsule (see JP-A No. 11-343439).

Also, there is proposed a carbon black aqueous dispersion obtained by oxidizing carbon black with ozone, wherein the dispersion has a pH of 5 to 10, and the carbon black has an average particle diameter of 10 nm to 30 nm and a DBP oil absorption of 50 cc/100 g to 180 cc/100 g (see JP-B No. 3874538).

It is said in these proposals that inks having superior high image density, scratch resistance, water resistance, marker resistance and discharge stability may be obtained, but they are not satisfactory in terms of storage stability of an ink, image density and image bleeding.

Also, to improve image density, image bleeding, storage stability and discharge stability of an ink, there is proposed an aqueous pigment dispersion including surface-modified carbon black which can be dispersed in water without a dispersant and has a value of an amount of hydrophilic functional group/specific surface area in a range of 5 $\mu$mol/$m^2$ to 30 $\mu$mol/$m^2$ (see JP-A No. 2000-319572). In this proposal, the surface-modified carbon black is oxidized by hypohalous acid or a salt thereof.

However, a wet oxidation process with hypohalous acid or a salt thereof is carried out in this proposal, and this requires dehydration, washing and so on, which is costly. Also, since salts and so on remains in the washing, storage stability of the ink decreases when it is used for inkjet printing. Further, it is not satisfactory in terms of image density in a case of using non-smooth paper as a recording medium.

Accordingly, it has been desired to provide an ink for inkjet recording having favorable storage stability and discharge stability of the ink, enables high image density on both smooth paper and non-smooth paper and improves image bleeding, and related technologies thereof.

SUMMARY OF THE INVENTION

The present invention aims at providing an ink for inkjet recording having favorable storage stability and discharge stability of the ink, enables high image density on both smooth paper and non-smooth paper and improves image bleeding.

An ink for inkjet recording as a means for solving the above problems includes:

a pigment;

a penetrating agent; and water, wherein the pigment includes:

an ozone-oxidized carbon black, including carbon black oxidized by ozone and having a volatile matter content of the carbon black of 10% by mass to 20% by mass and a BET specific surface area of 90 $m^2$/g to 150 $m^2$/g; and a resin-coated carbon black, including: carbon black; and a resin present on a surface of the carbon black.

According to the present invention, the conventional problems may be solved, the object may be achieved, and an ink for inkjet recording having favorable storage stability and discharge stability of the ink, enables high image density on both smooth paper and non-smooth paper and improves image bleeding may be provided.

DETAILED DESCRIPTION OF THE INVENTION

Ink for Inkjet Recording

Figure 1:
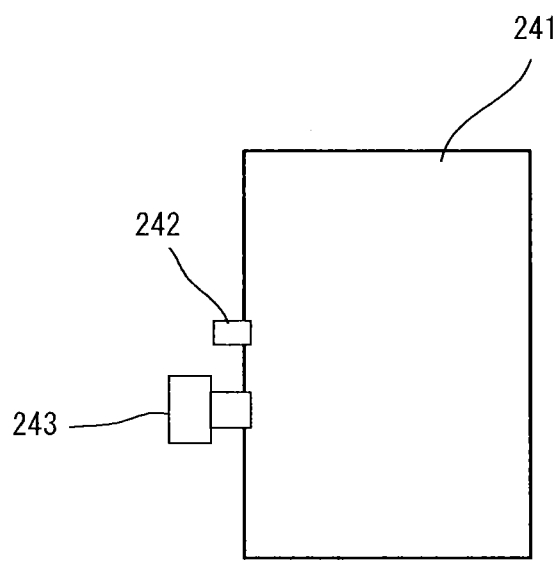
FIG. 1 is a schematic diagram illustrating one example of an ink cartridge of the present invention.

An ink for inkjet recording of the present invention includes a pigment, a penetrating agent and water. It preferably includes a resin and a fluorosurfactant, and it further includes other components according to necessity.

<Pigment>

The pigment includes an ozone-oxidized carbon black and a resin-coated carbon black.

When the pigment is only the ozone-oxidized carbon black as the carbon black oxidized by ozone, image density is insufficient on smooth gloss paper, and it is not satisfactory in terms of image bleeding and discharge stability. On the other hand, when the pigment is only the resin-coated carbon black including carbon black and a resin present on a surface of the carbon black, it provides favorable image bleeding but is not satisfactory in terms of image density on plain paper and gloss paper and storage stability of the ink.

In the present invention, a combination of the ozone-oxidized carbon black and the resin-coated carbon black as the pigment provides high image density on both smooth paper and non-smooth paper and improves image bleeding without impairing discharge stability of the ink and storage stability of the ink.

<<Ozone-Oxidized Carbon Black>>

The ozone-oxidized carbon black is carbon black oxidized by ozone.

A content of a volatile matter in the ozone-oxidized carbon black is 10% by mass to 20% by mass, and preferably 12% by mass to 18% by mass. When the content is less than 10% by mass, image density in recording on plain paper may decrease. When the content exceeds 20% by mass, storage stability of the ink may degrade.

The volatile matter in the ozone-oxidized carbon black denotes a volatile (loss) matter when the ozone-oxidized carbon black is heated to a high temperature, and it denotes a volatilization volume of an oxygen-containing group chemically adsorbed to the carbon black. The chemically adsorbing oxygen-containing group is decomposed while it is heated at a high temperature, and carbon dioxide, carbon monoxide, moisture and so on vaporize as a gas.

Here, the content of the volatile matter in the ozone-oxidized carbon black may be measured according to a method described in DIN 53 552, for example. Specifically, a dried sample of the carbon black is stuffed with vibration and strokes in a platinum crucible or a porcelain crucible with lid that can be placed deep inside the crucible having the same shape and the same volume as the platinum crucible to an extent of not exceeding 2 mm below the lid, and a mass thereof ($W_D$) is weighed. Next, the lid is placed on the crucible, and the crucible is placed in an electric furnace and heated at 950° C.±25° C. for exactly 7 minutes. Then, it is taken out and allowed to cool in a desiccator until it reaches a room temperature (25° C.), and a mass after heating ($W_R$) is weighed. A value (V) obtained by applying these masses to the following formula is the volatile matter content (% by mass).

$$V = \frac{W_D - W_R}{W_D} \times 100$$

where, in the formula, V denotes the volatile matter content of the carbon black (% by mass); $W_D$ denotes the mass of the dried sample (g); $W_R$ denotes the mass of the sample after heating (g).

A BET specific surface area of the ozone-oxidized carbon black is 90 m$^2$/g to 150 m$^2$/g, and preferably 100 m$^2$/g to 130 m$^2$/g. When the BET specific surface area is less than 90 m$^2$/g, image density may decrease. When it exceeds 150 m$^2$/g, storage stability of the ink may degrade.

Here, the BET specific surface area of the ozone-oxidized carbon black may be measured according to a BET method by adsorption of nitrogen (DIN 66132), for example.

Such an ozone-oxidized carbon black may be manufactured by subjecting carbon black having a BET specific surface area of 90 m$^2$/g to 150 m$^2$/g to an oxidation treatment by ozone so as to adjust the volatile matter content of the carbon black to 10% by mass to 20% by mass. Here, the ozone oxidation treatment does not change the BET specific surface area of the carbon black.

A method of the ozone oxidation treatment of the carbon black is not particularly restricted, and it may be appropriately selected according to purpose. Nonetheless, a dry method of passing an ozone gas through carbon black is preferable in view of high oxidation treatment capacity. Sufficient oxidation may not be possible with a wet ozone oxidation treatment through water due to a reaction of water and ozone.

The ozone-oxidized volatile matter content of the carbon black can be controlled by adjusting an ozone generated amount and an ozone oxidation treatment time. By increasing the ozone generated amount (concentration) or by increasing the ozone oxidation treatment time, the ozone-oxidized carbon black having a more volatile matter content is obtained.

Here, a relationship between the ozone oxidation treatment time and the carbon black volatile matter content is a substantially straight line (linear), but it reaches saturation once it exceeds a certain time (i.e. the carbon black volatile matter content no longer increases). Thus, it is preferable to adjust the oxidation treatment time while checking the volatile matter content of the carbon black. Also, since conditions of the ozone oxidation treatment varies depending on characteristics of the carbon black prior to the ozone oxidation treatment or an amount of impurities, an appropriate adjustment is preferable. Here, ozone can be obtained by passing air or oxygen through an ozone generator.

Whether or not the carbon black is oxidized with ozone may be estimated, for example, by measuring surface functional groups or adsorbed substances and analyzing their changes.

The carbon black used for the ozone oxidation treatment is not particularly restricted as long as it has a BET specific surface area of 90 m$^2$/g to 150 m$^2$/g, and it may be appropriately selected according to purpose. Nonetheless, it preferably has a DBP oil absorption (DIN ISO 787/5 method) of 230 mL/100 g or greater in view of image density.

Here, DBP (dibutyl phthalate) is added dropwise to the carbon black so as to have DBP penetrate into voids of the carbon. Then, the DBP oil absorption may be obtained from an amount of the DBP required for filling the voids per 100 g of the carbon black.

Examples of the carbon black used for the ozone oxidation treatment include Ketjen black, furnace black, lampblack, acetylene black, thermal black and gas black. Among these, the gas black is preferable in view of image density. Also, carbon black with its surface subjected to an oxidation treatment or an alkali treatment may be used. The carbon black has a primary particle diameter of preferably 13 nm to 30 nm.

Commercial products may be used as the carbon black used for the ozone oxidation treatment, and examples of the commercial products include: #45L, MCF88, #990, MA600, #850 (all manufactured by Mitsubishi Chemical Corporation); NIPEX90, NIPEX150, NIPEX160, NIPEX170, NIPEX180, Color Black FW200, PRINTEX25, PRINTEX35, PRINTEX-U, PRINTEX140, Special Black250 (all manufactured by Evonik Degussa Japan Co., Ltd.); REGAL400R, REGAL600R, MOGUL L (all manufactured by Cabot).

The ozone-oxidized carbon black may be added directly to the ink, but it is preferable to add it to the ink as an ozone-oxidized carbon black dispersion.

The ozone-oxidized carbon black dispersion includes the ozone-oxidized carbon black, includes water and a basic compound, and further includes other components according to necessity.

A content of the ozone-oxidized carbon black in the ozone-oxidized carbon black dispersion with respect to the entire ozone-oxidized carbon black dispersion is preferably 5% by mass to 25% by mass, and more preferably 10% by mass to 20% by mass. The content of the ozone-oxidized carbon black of 5% by mass or greater does not degrade productivity. The content of 25% by mass or less does not excessively increase a viscosity of the ozone-oxidized carbon black dispersion and thus does not make dispersion of the ozone-oxidized carbon black difficult.

—Water—

The water is not particularly restricted, and it may be appropriately selected according to purpose. Examples thereof include: pure water such as ion-exchanged water, ultrafiltered water, reverse osmosis water and distilled water; and ultrapure water. These may be used alone or in combination of two or more.

—Basic Compound—

Examples of the basic compound include aminopropanediol compounds, alcohol amine compounds, ammonium hydroxides, phosphonium hydroxides, alkali metal hydroxide and alkali metal carbonates.

Examples of the aminopropanediol compounds include 1-amino-2,3-propanediol, 1-methylamino-2,3-propanediol, 2-amino-2-methyl-1,3-propanediol, and 2-amino-2-ethyl-1,3-propanediol.

Examples of the alcohol amines include diethanolamine and triethanolamine.

Examples of the ammonium hydroxides include ammonium hydroxide and quaternary ammonium hydroxide.

Examples of the phosphonium hydroxides include quaternary phosphonium hydroxide.

Examples of the alkali metal hydroxides include lithium hydroxide, potassium hydroxide and sodium hydroxide.

Examples of the alkali metal carbonates include lithium carbonate, sodium carbonate and potassium carbonate.

These may be used alone or in combination of two or more. Among these, the alkali metal hydroxides are preferable in view of effect of improving image density on gloss paper, and potassium hydroxide is particularly preferable.

By addition of the alkali metal hydroxides, a salt of the carboxyl group on the surface of the ozone-oxidized carbon black may be formed with the alkali metal.

A content of the basic compound in the ozone-oxidized carbon black dispersion is an amount such that a pH of the ozone-oxidized carbon black dispersion is adjusted to 6 to 8.

—Other Components—

To the ozone-oxidized carbon black dispersion, various additives such as dispersant, organic solvent and preservative may be added as the other components in addition to the ozone-oxidized carbon black, the water and the basic compound.

—Dispersant—

Examples of the dispersant include: surfactants such as anionic surfactant, cationic surfactant, amphoteric surfactant and nonionic surfactant; and a polymer dispersant. These may be used alone or in combination of two or more.

Examples of the anionic surfactant include alkyl sulfocarboxylates, α-olefin sulfonate, polyoxyethylene alkyl ether acetate, N-acylamino acid and salts thereof, N-acylmethyl taurate, alkyl sulfate polyoxyethylene alkyl ether sulfate, alkyl sulfate polyoxyethylene alkyl ether phosphate, rosin acid soap, castor oil sulfate, lauryl alcohol sulfate, alkylphenol phosphate, naphthalene sulfonate formaldehyde condensate, alkyl phosphate, alkylaryl sulfonate, diethyl sulfosuccinate, diethylhexyl sulfosuccinate, and dioctyl sulfosuccinate.

Examples of the cationic surfactant include 2-vinylpyridine derivatives and poly-4-vinylpyridine derivatives.

Examples of the amphoteric surfactant include betaine lauryldimethylaminoacetate, 2-alkyl-N-carboxymethyl-N-hydroxyethylimidazolinium betaine, palm oil aliphatic acid amide propyldimethylaminoacetic acid betaine, polyoctylpolyaminoethylglycine and imidazoline derivatives thereof.

Examples of the non-ionic surfactant include: ether-based non-ionic surfactants such as polyoxyethylene nonylphenyl ether, polyoxyethylene octylphenyl ether, polyoxyethylene dodecylphenyl ether, polyoxyethylene lauryl ether, polyoxyethylene oleyl ether, polyoxyethylene alkyl ether and polyoxyalkylene alkyl ether; ester-based non-ionic surfactants such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate and polyoxyethylene stearate; and acetylene glycol-based non-ionic surfactant such as 2,4,7,9-tetramethyl-5-decyne-4,7-diol, 3,6-dimethyl-4-octyne-3,6-diol and 3,5-dimethyl-1-hexyne-3-ol.

The polymer dispersant is not particularly restricted, and it may be appropriately selected according to purpose. Examples thereof include a water-soluble styrene-acrylic resin and a water-soluble urethane resin.

—Organic Solvent—

The organic solvent is not particularly restricted, and it may be appropriately selected according to purpose. Examples thereof include: alcohols such as methanol, ethanol, 1-propanol and 2-propanol; polyhydric alcohols such as ethylene glycol, diethylene glycol, triethylene glycol, propylene glycol and glycerin; pyrrolidone derivatives such as N-methylpyrrolidone and 2-pyrrolidone; ketones such as acetone and methyl ethyl ketone; and alkanolamines such as monoethanolamine, diethanolamine and triethanolamine. These may be used alone or in combination of two or more.

<Method for Manufacturing Ozone-Oxidized Carbon Black Dispersion>

The ozone-oxidized carbon black dispersion may be manufactured by dispersing the ozone-oxidized carbon black, the water, the basic compound and various additives according to necessity by wet dispersion method using a disperser such as sand mill, ball mill, roll mill, bead mill, nanomizer and homogenizer.

<<Resin-Coated Carbon Black>>

The resin-coated carbon black is a so-called capsule carbon black, where a surface of carbon black is hydrophilized by coating the carbon black with a resin so that it disperses in water. The resin-coated carbon black may also be regarded as particles that carbon black is coated with a resin. In the resin-coated carbon black, the carbon black is at least partially coated with the resin, and it is not necessary to be coated completely with the resin.

—Resin—

The resin is not particularly restricted, and it may be appropriately selected according to purpose. Examples thereof include a polyamide resin, a polyurethane resin, a polyester resin, a polyurea resin, an epoxy resin, a polycarbonate resin, a urea resin, a melamine resin, a phenolic resin, polysaccharides, gelatin, Arabic gum, dextran, casein, natural rubber, carboxypolymethylene, polyvinyl alcohol, polyvinylpyrrolidone, polyvinyl acetate, polyvinyl chloride, polyvinylidene chloride, cellulose, ethylcellulose, methylcellulose, nitrocellulose, hydroxyethylcellulose, acetylcellulose, polyethylene, polystyrene, polymers or copolymers of (meth)acrylic acid, polymers or copolymers of (meth)acrylic acid ester, copolymers of (meth)acrylic acid-(meth)acrylic acid ester, a styrene-(meth)acrylic acid copolymer, a styrene-maleic acid copolymer, sodium alginate, fatty acids, paraffin, beeswax, water wax, beef tallow, carnauba wax and albumin. These may be used alone or in combination of two or more.

More examples of the resin include: a resin having an anionic group such as carboxylic acid group and sulfonic acid group; and a resin having a non-ionic group. Examples the resin having a non-ionic group include homopolymers or copolymers of polyethylene glycol monomethacrylate, polypropylene glycol monomethacrylate and methoxypolyethylene glycol monomethacrylate, polyvinyl alcohol, and a cationic ring-opened polymer of 2-oxazoline.

An amount of the resin in the resin-coated carbon black is not particularly restricted, and it may be appropriately selected according to purpose. Nonetheless, with respect to the carbon black, it is preferably 10% by mass to 90% by mass, and more preferably 20% by mass to 70% by mass. When the amount of the resin is less than 10% by mass, there are cases where an effect of coating is not easily obtained. When it exceeds 90% by mass, there are cases where coloring property of the carbon black degrades. When the amount of the resin is within the preferable range, a content of the resin in the resin-coated carbon black is relatively small, which can suppress degradation of coloring property of the carbon black. When the amount of the resin is within the more preferable range, a part of the carbon black is substantially uncoated and exposed, which can suppress degradation of coloring property. Also, since the part of the carbon black is unexposed and substantially coated, it is possible to obtain an effect of the coated carbon black. Here, the "substantially exposed" does not mean exposure associated with defects such as pinholes and cracks but means intentional exposure.

A method for coating the carbon black with the resin is not particularly restricted, and it may be appropriately selected according to purpose. Examples thereof include a chemical process, a physical process, a physicochemical process and a mechanical process. Specific examples thereof include an acid-precipitation method, a phase-inversion method, an interfacial-polymerization method, an in-situ polymerization method, an in-liquid cured-coating method, a coacervation (phase-separation) method, an in-liquid drying method, a fusion-dispersion-cooling method, an in-air suspension-coating method and a spray-drying method. Among these, the in-liquid drying method, the acid-precipitation method and the phase-inversion method are preferable.

The in-liquid drying method is not particularly restricted, and it may be appropriately selected according to purpose. For example, carbon black is dispersed in an organic solvent solution including a resin dissolved therein to prepare a dispersion, the dispersion is added to water to form a composite emulsion, and by eliminating gradually the organic solvent including the resin dissolved therein, the carbon black is coated with the resin.

The phase-inversion method is not particularly restricted, and it may be appropriately selected according to purpose. For example, a mixture of the carbon black with an anionic group-containing resin having a self dispersible ability or a dissolving ability against water or a mixture of the carbon black, a curing agent and an anionic group-containing resin is prepared as an organic solvent phase. Water is added to the organic solvent phase, or the organic solvent phase is added to water. Then, while it undergoes self-dispersion (phase-inversion emulsification), carbon black is coated with the resin.

The acid-precipitation method is not particularly restricted, and it may be appropriately selected according to purpose. For example, a water-containing cake is obtained by a step of kneading an anionic group-containing resin having an anionic group partially or entirely neutralized by a basic compound and the carbon black in an aqueous medium, followed by a step of precipitating the anionic group-containing resin by adjusting the pH thereof to neutral or acidic with an acidic compound to fix it on the carbon black. Then, by using a basic compound to neutralize the anionic group partially or entirely, the resin is coated with the carbon black.

—Carbon Black—

The carbon black used for the resin coating is not particularly restricted, and it may be appropriately selected according to purpose.

A manufacturing method of the carbon black is not particularly restricted, and it may be appropriately selected according to purpose. Examples thereof include a furnace method and a channel method.

Commercial products may be used as the carbon black. Examples of the commercial products include No. 2300, No. 900, MCF-88, No. 33, No. 40, No. 45, No. 52, MA7, MA8, MA100, No. 2200B (all manufactured by Mitsubishi Chemical Corporation), Raven 700, 5750, 5250, 5000, 3500, 1255 (all manufactured by Columbian Chemicals Company), REGAL 400R, 330R, 660R, MoguIL, Monarch 700, 800, 880, 900, 1000, 1100, 1300, Monarch1400 (all manufactured by Cabot), Color Black FW1, FW2, FW2V, FW18, FW200, S150, S160, S170 (all manufactured by Evonik Degussa Japan Co., Ltd.), PRINTEX35, U, V, 140U, 140V (all manufactured by Evonik Degussa Japan Co., Ltd.), and Special Black 6, 5, 4A, 4 (all manufactured by Evonik Degussa Japan Co., Ltd.).

A size of the carbon black is not particularly restricted, and it may be appropriately selected according to purpose. Nonetheless, it has an average primary particle diameter of preferably 15 nm to 40 nm.

A specific surface area of the carbon black is not particularly restricted, and it may be appropriately selected according to purpose. Nonetheless, a specific surface area by a BET method of 50 m²/g to 300 m²/g is preferable.

The resin-coated carbon black may be added directly to the ink, but it is preferable to add it to the ink as a resin-coated carbon black dispersion.

The resin-coated carbon black dispersion includes the resin-coated carbon black, includes water, and further includes other components according to necessity.

—Water—

As the water, it is possible to use water similar to those of the ozone-oxidized carbon black dispersion.

—Other Components—

To the resin-coated carbon black dispersion, various additives such as pH adjuster, dispersant, organic solvent and preservative may be added as the other components in addition to the resin-coated carbon black and the water.

As the pH adjuster, those similar to the basic compound of the ozone-oxidized carbon black dispersion may be used. Also, the dispersant, the organic solvent and the preservative may be similar to those of the ozone-oxidized carbon black dispersion.

—Manufacturing Method of Resin-Coated Carbon Black Dispersion—

The resin-coated carbon black dispersion may be manufactured by dispersing the resin-coated carbon black, the water and the various additives according to necessity by wet dispersion method using a disperser such as sand mill, ball mill, roll mill, bead mill, nanomizer and homogenizer.

A content of the ozone-oxidized carbon black and the resin-coated carbon black in the ink for inkjet recording is not particularly restricted, and it may be appropriately selected according to purpose. Nonetheless, it is preferably 1% by mass to 20% by mass, and more preferably 3% by mass to 15% by mass.

The content of 1% by mass or greater provides high image density. The content of 20% by mass or less produces a low-viscosity ink, which may form a vivid image without sacrificing discharge stability.

A mass ratio of the ozone-oxidized carbon black CB1 to the resin-coated carbon black CB2 (CB1:CB2) is not particularly restricted, and it may be appropriately selected according to purpose. Nonetheless, it is preferably 10:90 to 50:50, more preferably 10:90 to 40:60, and further preferably 15:85 to 30:70. The amount of the ozone-oxidized carbon black CB1 of 10% by mass or greater provides high image density. The amount of 50% by mass or less provides high image density even on gloss paper. A vivid image may be formed without occurrences of image bleeding, and storage stability of the ink is also favorable.

With the mass ratio (CB1:CB2) within the preferable numerical range, high image density can be achieved on plain paper (non-smooth paper) as well as gloss paper (smooth paper), no image bleeding occurs, and storage stability of the ink is improved.

A 50% cumulative particle size in a volume-based particle size distribution (D50) of the ozone-oxidized carbon black and the resin-coated carbon black in the ink is not particularly restricted, and it may be appropriately selected according to purpose. Nonetheless, it is preferably 90 nm to 150 nm, and more preferably 110 nm to 130 nm. With the 50% cumulative particle size (D50) of 90 nm or greater, favorable storage stability of the ink can be achieved with no discharge failure. With the 50% cumulative particle size (D50) of 150 nm or less, high image density may be achieved on both plain paper and gloss paper, no image bleeding occurs, and a vivid image may be formed.

The 50% cumulative particle size (D50) may be measured using a particle size distribution analyzer (UPA150, manufactured by Nikkiso Co., Ltd.), for example.

<Penetrating Agent>

As the penetrating agent, it is preferable to include at least one type of a polyol compound having a solubility in water at 20° C. of 0.2% by mass to 5.0% by mass.

Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, and 2,2,4-trimethyl-1,3-pentanediol. These may be used alone or in combination of two or more. Among these, 2-ethyl-1,3-hexanediol and 2,2,4-trimethyl-1,3-pentanediol are particularly preferable.

Other penetrating agents that can be used in combination are not particularly restricted as long as they dissolve in the ink for inkjet recording and adjust to desired physical properties, and they may be appropriately selected according to purpose. Examples thereof include: alkyl and aryl ethers of a polyhydric alcohol such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; lower alcohols such as ethanol.

A content of the penetrating agent in the ink for inkjet recording is preferably 0.1% by mass to 4% by mass. When the content is less than 0.1% by mass, fast-drying property cannot be obtained, which may result in a blurred image. When the content exceeds 4% by mass, dispersion stability of the pigment is impaired. As a result, the nozzles may be easily clogged, or permeability to a recording medium may increase excessively, causing decrease in image density or strikethrough.

<Resin>

The resin is not particularly restricted, and it may be appropriately selected according to purpose. Examples thereof include an acrylic resin, a vinyl acetate resin, a styrene-butadiene resin, a vinyl chloride resin, a acrylic-styrene resin, an acrylic-silicone resin, a silicone-modified acrylic resin, a butadiene resin, a styrene-based resin, an urethane resin, an acrylic-urethane resin, and an anionic self-emulsifying ether-based polyurethane resin. Among these, the anionic self-emulsifying ether-based polyurethane resin is particularly preferable since it can improve storage stability of the ink while high image density is maintained.

The anionic self-emulsifying ether-based polyurethane resin denotes various water dispersible urethane resins obtained by a reaction of at least a diisocyanate compound, a polyether diol and a diol containing an acid group such as carboxylic acid group and sulfonic acid group.

Examples of the diisocyanate include: aliphatic diisocyanate compounds such as hexamethylene diisocyanate and 2,2,4-trimethylhexamethylene diisocyanate; alicyclic diisocyanate compounds such as isophorone diisocyanate, hydrogenated xylylene diisocyanate, 1,4-cyclohexane diisocyanate and 4,4'-dicyclohexyl diisocyanate; aromatic-aliphatic diisocyanate compounds such as xylylene diisocyanate and tetramethylxylene diisocyanate; aromatic diisocyanate compounds such as toluylene diisocyanate and phenylmethane diisocyanate; modified products of these diisocyanate (e.g. modified product including carbodiimide, uretidiones, and uretoimin).

Examples of the diol compound include polyether diols such as polyethylene glycol, polypropylene glycol, polytetramethylene ether glycol and polyhexamethylene ether glycol. Since the polyether is hard to alteration by hydrolysis in water, storage stability of the ink becomes favorable.

Examples of the diol containing an acid group include dimethylolacetic acid, dimethylolbutanoic acid, dimethylolpropionic acid and dimethylolbutyric acid. Among these, dimethylolbutanoic acid is particularly preferable.

Examples of a method for synthesizing the urethane resin include: a solution method to obtain a polyurethane dispersion, wherein an isocyanate-terminated prepolymer is synthesized in a low-boiling-point solvent which does not react with an isocyanate group (e.g. acetone), a hydrophilic group is introduced by means of a diamine or a polyol, it is diluted with water for phase transformation, and the solvent is distilled; a prepolymer method, wherein an isocyanate-terminated prepolymer having a hydrophilic group introduced is synthesized first and then dispersed in water, and it is subjected to chain extension with an amine; a hot-melt method; a method of using an urethane prepolymer as an emulsifier and water as a medium in an aqueous solution as a chain extender, a method including a step of sulfonation of an aromatic ring of an urethane prepolymer having a free isocyanate group obtained from a hydrophobic polyol and an aromatic polyisocyanate; and a method of using a blocked isocyanate. Among these, the method of synthesizing a urethane resin by prepolymer method is preferable. At this time, a low-molecular-weight polyhydroxy compound is preferably used.

Examples of the low-molecular-weight polyhydroxy compound include: the glycols exemplified as a material of the polyester diol and low-mole alkylene oxide adducts thereof; and trihydric alcohols such as glycerin, trimethylolethane and trimethylolpropane, and low-mole alkylene oxide adducts thereof.

For an aqueous urethane resin, a method of subjecting a urethane prepolymer prepared in an organic solvent phase to phase inversion-emulsification for further chain extension in an aqueous phase is generally known. A chain extender in this case is generally a polyamine such as diamine. Specifically, the urethane prepolymer is extended with water or di- or triamine after or while neutralizing an acid group derived from the dimethylolalkanoic acid. The polyamine used as the chain extender for the amine extension is usually a diamine or a triamine, and specific examples thereof include hexamethylene diamine, isophorone diamine, hydrazine and piperazine. However, it has been found that there is a tendency of unfavorable storage stability of the ink when the polyamine is used as the chain extender for the urethane resin. It is presumed that this causes doubly adverse effects since the amine-extended urethane resin (polyurethane resin including a polyurethane-urea portion) is susceptible to hydrolysis and a polyamine as a product of the hydrolysis functions as an agglomeration agent in the ink.

The urethane resin may be used in a form of a salt of an alkali metal such as Li, Na and K or an organic amine salt of ammonia, dimethylamine, (mono, di, tri)ethanolamine and so on. These may be obtained by further neutralization of the urethane resin by the aforementioned method. A base used for this neutralization may be appropriately selected according to a counter ion of a desired salt, and examples thereof include alkylamines such as butylamine and triethylamine, alkanol amines such as monoethanolamine, diethanolamine and triethanolamine, morpholine and inorganic bases such as ammonia and sodium hydroxide.

The anionic self-emulsifying ether-based polyurethane resin is not particularly restricted, and it may be appropriately selected according to purpose. Those appropriately synthesized or commercial products may be used. Examples of the commercial products include: SF460, SF460S, SF420, SF110, SF300, SF361 (polyurethane resin emulsion, manufactured by Dai-ichi Kogyo Seiyaku Co., Ltd.); W-6020, W-5025, W-5661, W-6010 (polyurethane resin emulsion, manufactured by Mitsui Chemicals Polyurethane Inc.).

An acid value of the anionic self emulsifying ether-based polyurethane resin is preferably 40 mgKOH/g to 100 mgKOH/g.

It is preferable to add the anionic self-emulsifying ether-based polyurethane resin during preparation of the carbon black dispersion since it is more effective in improving storage stability of the ink.

<Fluorosurfactant>

The fluorosurfactant has preferably 2 to 16 fluorine-substituted carbon atoms, and more preferably 4 to 16 fluorine-substituted carbon atoms. When the number of the fluorine-substituted carbon atoms is less than 2, an effect of fluorine may not be obtained. When it exceeds 16, a problem of storage stability of the ink may occur.

Examples of the fluorosurfactant include perfluoroalkyl sulfonic acid compounds, perfluoroalkyl carboxylic acid compounds, perfluoroalkyl phosphate ester compounds, perfluoroalkyl ethylene oxide adducts, and polyoxyalkylene ether polymer compounds having a perfluoroalkyl ether group in a side chain thereof. Among these, the polyoxyalkylene ether polymer compounds having a perfluoroalkyl ether group in a side chain thereof is particularly preferable in view of less foaming property.

Examples of the perfluoroalkyl sulfonic acid compounds include perfluoroalkyl sulfonic acid and perfluoroalkyl sulfonate.

Examples of the perfluoroalkyl carboxylic acid compounds include perfluoroalkyl carboxylic acid and perfluoroalkyl carboxylate.

Examples of the perfluoroalkyl phosphate ester compounds include perfluoroalkyl phosphate ester and salts of perfluoroalkyl phosphate ester.

Examples of polyoxyalkylene ether polymer compounds having a perfluoroalkyl ether group in a side chain thereof include a polyoxyalkylene ether polymer having a perfluoroalkyl ether group in a side chain thereof, a sulfate salt of a polyoxyalkylene ether polymer having a perfluoroalkyl ether group in a side chain thereof, and a salt of a polyoxyalkylene ether polymer having a perfluoroalkyl ether group in a side chain thereof.

Examples of counter ions in the fluorosurfactant include Li, Na, K, $NH_4$, $NH_3CH_2CH_2OH$, $NH_2(CH_2CH_2OH)_2$ and $NH(CH_2CH_2OH)_3$.

The fluorosurfactant is not particularly restricted. Those appropriately synthesized or commercial products may be used. Examples of the commercial products include: SURFLON series, manufactured by Asahi Glass Co., Ltd. (S-111, S-112, S-113, S-121, S-131, S-132, S-141, S-145); FLUORAD series, manufactured by Sumitomo 3M Ltd. (FC-93, FC-95, FC-98, FC-129, FC-135, FC-170C, FC-430, FC-431); MEGAFACE series, manufactured by DIC Corporation (F-470, F-1405, F-474), ZONYL TBS, FSP, FSA, FSN-100, FSN, FSO-100, FSO, FS-300, UR, manufactured by DuPont Co.; FT-110, FT-250, FT-252, FT-400S, FT-150, FT-400SW, manufactured by Neos Company Ltd.; PF-151N, manufactured by Omnova.

A content of the fluorosurfactant in the ink for inkjet recording is preferably 0.01% by mass to 4% by mass, and more preferably 0.1% by mass to 1% by mass. When the content is less than 0.01% by mass, an effect of the addition of the fluorosurfactant may be lost. When it exceeds 4% by mass, penetration to the recording medium becomes higher than necessary, which may decrease image density or cause strikethrough.

In addition to the fluorosurfactant, the recording ink may include other surfactants. Examples of the other surfactants include a silicone surfactant, an anionic surfactant, a non-ionic surfactant and an amphoteric surfactant.

The silicone surfactant is not particularly restricted and it may be appropriately selected according to purpose. Among these, those which do not decompose even at a high pH are preferable, and examples thereof include a side chain-modified polydimethylsiloxane, a both terminals-modified polydimethylsiloxane, a one terminal-modified polydimethylsiloxane and a side chain and both terminals-modified polydimethylsiloxane. Those including a polyoxyethylene group or a polyoxyethylene polyoxypropylene group as a modifying group are particularly preferable since they have favorable characteristics as an aqueous surfactant.

As the silicone surfactant, appropriately synthesized compounds or commercial products may be used. As the commercial products, products of BYK-Chemie, Inc., Shin-Etsu Chemical Co., Ltd., Dow Corning Toray Co., Ltd. and so on are readily available.

A polyether-modified silicone surfactant may also be used as the silicone surfactant, and examples thereof include a compound having a polyalkylene oxide structure introduced in a Si side chain of dimethyl siloxane.

As the polyether-modified silicone compounds, those appropriately synthesized or commercial products may be used. Examples of the commercial products include KF-618, KF-642, and KF-643, manufactured by Shin-Etsu Chemical Co., Ltd.

Examples of the anionic surfactant include polyoxyethylene alkyl ether acetate, dodecylbenzene sulfonate, succinate sulfonate, laurate and polyoxyethylene alkyl ether sulfate.

Examples of the non-ionic surfactant include acetylene glycol-based surfactants, polyoxyethylene alkyl ethers, polyoxyethylene alkylphenyl ethers, polyoxyethylene alkyl esters, and polyoxyethylene sorbitan fatty acid esters.

Examples of the acetylene glycol-based surfactants include 2,4,7,9-tetramethyl-5-decyne-4,7-diol, 3,6-dimethyl-4-octyne-3,6-diol, and 3,5-dimethyl-1-hexyne-3-ol Examples of commercial products of the acetylene glycol-based surfactants include SURFYNOL series (104, 82, 465, 485, TG), manufactured by Air Products and Chemicals, Inc.

Examples of the amphoteric surfactant include laurylaminopropionate, lauryl dimethyl betaine, stearyl dimethyl betaine, lauryl dihydroxyethyl betaine, lauryl dimethylamine oxide, myristyl dimethylamine oxide, stearyl dimethylamine oxide, dihydroethyl lauryl amine oxide, polyoxyethylene palm oil alkyldimethylamine oxide, dimethylalkyl(palm)betaine, and dimethyl lauryl betaine. Commercial products of the amphoteric surfactant are readily available from Nikko Chemicals Co., Ltd., Nihon-Emulsion Co., Ltd., Nippon Shokubai Co., Ltd., Toho Chemical Industry Co., Ltd., Kao Corporation, Adeca Corporation, Lion Corporation, Aoki Oil Industrial Co., Ltd., Sanyo Chemical Industries, Ltd. and so on.

The various surfactants may be used alone or in combination. Even when it does not easily dissolve in the ink for inkjet recording by itself, there are cases where a mixture of two or more of the surfactants is solubilized and exists stably.

<Other Components>

As the other components, other components such as colorant, organic solvent, pH adjuster, antiseptic and fungicide, chelate reagent, rust inhibitor, antioxidant, ultraviolet absorber, oxygen absorber and light stabilizer may be included.

—Colorant—

In addition to a black ink with the carbon black as the colorant, a color ink or a clear ink may be used according to necessity.

Examples of the color ink include magenta pigments, cyan pigments and yellow pigments.

Examples of the magenta pigments include C. I. Pigment Red 5, 7, 12, 48 (Ca), 48 (Mn), 57 (Ca), 57:1, 112, 122, 123, 168, 184, 202, C. I. Pigment Violet 19.

Examples of the cyan pigments include C. I. Pigment Blue 1, 2, 3, 15, 15:3, 15:4, 16, 22, 60, and C. I. Vat Blue 4, 60.

Examples of the yellow pigments include C. I. Pigment Yellow 1, 2, 3, 12, 13, 14, 16, 17, 73, 74, 75, 83, 93, 95, 97, 98, 114, 120, 128, 129, 138, 150, 151, 154, 155, 180.

—Organic Solvent—

The organic solvent is not particularly restricted, and it may be appropriately selected according to purpose. Examples thereof include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other organic solvents. These may be used alone or in combination of two or more. Here, the organic solvent may also be referred to as a wetting agent.

Examples of the polyhydric alcohols include glycerin, diethylene glycol, 1,3-butanediol, 3-methyl-1,3-butanediol, triethylene glycol, propylene glycol, dipropylene glycol, trimethylolethane, trimethylolpropane, ethylene glycol, tripropylene glycol, tetraethylene glycol, hexylene glycol, polyethylene glycol, polypropylene glycol, 1,5-pentanediol, 1,6-hexanediol, 1,2,6-hexanetriol, 1,2,4-butanetriol, 1,2,3-butanetriol, and petriol.

Among these, polyhydric alcohols having an equilibrium moisture content in an environment at 23° C. and 80% RH of 30% by mass or greater are preferable, and those having a high equilibrium moisture content and a high boiling point are particularly preferable.

The equilibrium moisture content is obtained as follows. That is, a temperature and a humidity in a desiccator is maintained at 23° C.±1° C. and 80±3% RH, respectively, using an aqueous solution saturated with potassium chloride/sodium chloride; 1 g of each organic solvent is weighed and placed on a petri dish, which is stored in this desiccator; a moisture content at equilibrium is measured, and the equilibrium moisture content is calculated based on the following formula.

Equilibrium moisture content (%)=[moisture content absorbed in organic solvent/(organic solvent+ moisture content absorbed in organic solvent)]× 100

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ethers include ethylene glycol monophenyl ether and ethylene glycol monobenzyl ether.

Examples of the nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam, and γ-butyrolactone.

Examples of the amides include formamide, N-methylformamide, and N,N-dimethylformamide.

Examples of the amines include monoethanolamine, diethanolamine, triethanolamine, monoethylamine, diethylamine, and triethylamine.

Examples of the sulfur-containing compounds include dimethyl sulfoxide, sulfolane, and thiodiethanol.

Examples of the other organic solvents include sugars. Examples of the sugars include monosaccharides, disaccharides, oligosaccharides (including trisaccharide and tetrasaccharides), and polysaccharides.

Examples of the monosaccharides, the disaccharides and the oligosaccharides (including trisaccharide and tetrasaccharides) include glucose, mannose, fructose, ribose, xylose, arabinose, galactose, maltose, cellobiose, lactose, sucrose, trehalose, and maltotriose.

The polysaccharides refer to sugars in a broad sense, and examples thereof include α-cyclodextrin and cellulose.

Examples of derivatives of the sugars include the reducing sugar of sugars [e.g. sugar alcohols represented by a general formula: $HOCH_2(CHOH)_nCH_2OH$ (n=integer of 2 to 5)], oxidized sugars (e.g. aldonic acid, uronic acid and so on), amino acids, and thioacids. Among these, the sugar alcohols are particularly preferable.

Examples of the sugar alcohols include maltitol and sorbit.

Among the organic solvents, glycerin and 1,3-butanediol are particularly preferable in view of storage stability and discharge stability.

A content of the organic solvent in the ink for inkjet recording is not particularly restricted, and it may be appropriately selected according to purpose. Nonetheless, it is preferably 20% by mass to 35% by mass, and more preferably 22.5% by mass to 32.5% by mass. When the content is within the preferable numerical range, extremely favorable results of drying properties, storage stability and reliability of the ink may be obtained. When the content is less than 20% by mass, the ink is likely to dry on a nozzle surface, which may cause discharge failure. When it exceeds 35% by mass, quality of characters on plain paper may decrease due to inferior drying properties on a paper surface.

—pH Adjuster—

The pH adjuster is not particularly restricted as long as it can adjust a pH without adversely affecting the performance of the ink for inkjet recording, and it may be appropriately selected according to purpose. Compounds similar to the basic compound of the ozone-oxidized carbon black dispersion may be used. Among them, an aminopropanediol compound is particularly preferable.

—Antiseptic and Fungicide—

Examples of the antiseptic and fungicide include sodium dehydroacetate, sodium sorbate, sodium 2-pyridinethiol-1-oxide, sodium benzoate, and sodium pentachlorophenol.

—Chelate Reagent—

Examples of the chelate reagent include sodium ethylenediaminetetraacetate, sodium nitrilotriacetate, sodium hydroxyethylethylenediamine triacetate, sodium diethylenetriamine pentaacetate, and sodium uramildiacetate.

—Rust Inhibitor—

Examples of the rust inhibitor include acid sulfite, sodium thiosulfate, ammonium thiodiglycolate, diisopropylammonium nitrite, pentaerythritol tetranitrate, and dicyclohexylammonium nitrite.

—Antioxidant—

Examples of the antioxidant include phenol-based antioxidants (including hindered phenol-based antioxidants), amine-based antioxidants, sulfur-based antioxidants, and phosphorus-based antioxidants.

Examples of the phenol-based antioxidants (including hindered phenol-based antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]-2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzynbenzene, and tetrakis[methylene-3-(3',5'-di-tert-butyl-4'-hydroxyphenyl)propionate]methane.

Examples of the amine-based antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butylphenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, and 1,1,3-tris(2-methyl-4-hydroxy-5-tert-butylphenyl)butane.

Examples of the sulfur-based antioxidants include dilauryl-3,3'-thiodipropionate, distearyl thiodipropionate, lauryl-stearyl thiodipropionate, dimyristyl-3,3'-thiodipropionate, distearyl-β,β'-thiodipropionate, 2-mercaptobenzoimidazole, and dilaurylsulfide.

Examples of the phosphorus-based antioxidants include triphenylphosphite, octadecylphosphite, triisodecylphosphite, trilauryltrithiophosphite, and trinonylphenylphosphite.

—Ultraviolet Absorber—

Examples of the ultraviolet absorber include a benzophenone-based ultraviolet absorber, a benzotriazole-based ultraviolet absorber, a salicylate-based ultraviolet absorber, a cyanoacrylate-based ultraviolet absorber, and a nickel complex salt-based ultraviolet absorber.

Examples of the benzophenone-based ultraviolet absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole-based ultraviolet absorber include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chloro-benzotriazole.

Examples of the salicylate-based ultraviolet absorber include phenylsalicylate, p-tert-butyl-phenylsalicylate, and p-octylphenylsalicylate.

Examples of the cyanoacrylate-based ultraviolet absorber include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of the nickel complex salt-based ultraviolet absorber include nickel bis(octylphenyl)sulfide, 2,2'-thiobis(4-tert-octylphelate)-n-butylamine nickel(II), 2,2'-thiobis(4-tert-octylphelate)-2-ethylhexylamine nickel(II), and 2,2'-thiobis(4-tert-octylphelate)triethanolamine nickel(II).

The ink for inkjet recording of the present invention is not particularly restricted, and it may be manufactured by heretofore known methods. For example, the pigment (pigment dispersion), the water and the penetrating agent, preferably the resin, the fluorosurfactant and other components according to necessity are stirred and mixed using a sand mill, a ball mill, a roll mill, a bead mill, a nanomizer, a homogenizer, an ultrasonic disperser and so on; coarse particles are filtered using a filter, a centrifuge and so on, followed by deaeration according to necessity; thereby, the ink may be obtained. The stirring and mixing may be carried out with a stirrer, a magnetic stirrer, a high-speed disperser and so on using an ordinary stirring blade.

Physical properties of the ink for inkjet recording of the present invention are not particularly restricted, and they may be appropriately selected according to purpose. For example, it preferably has a surface tension and a pH in the following ranges.

The surface tension of the ink for inkjet recording at 20° C. is preferably 25 mN/m to 55 mN/m. When the surface tension is less than 25 mN/m, bleeding on a recording medium becomes significant, and stable jetting may not be achieved. When the surface tension exceeds 55 mN/m, the ink does not sufficiently penetrate into a recording medium, which may lead to prolonged drying time.

The pH of the ink for inkjet recording is preferably 7 to 10.

The ink for inkjet recording of the present invention may be favorably used in various fields, and it may be favorably used in an image recording apparatus (e.g. printer) by an inkjet recording method. For example, it may be used in a printer having a function of promoting image fixing by heating a recording medium and the ink for inkjet recording at 50° C. to 200° C. during printing or before and after printing. It is particularly favorably used in an ink cartridge of the present invention, an inkjet recording apparatus and an inkjet recording method explained below.

(Ink Cartridge)

An ink cartridge of the present invention includes the ink for inkjet recording of the present invention contained in a container, and it further includes appropriately selected other members according to necessity.

The container is not particularly restricted, and its shape, structure, size and material may be appropriately selected according to purpose. Favorable examples thereof include those having at least a ink bag formed of an aluminum laminate film and a resin film.

Figure 2:
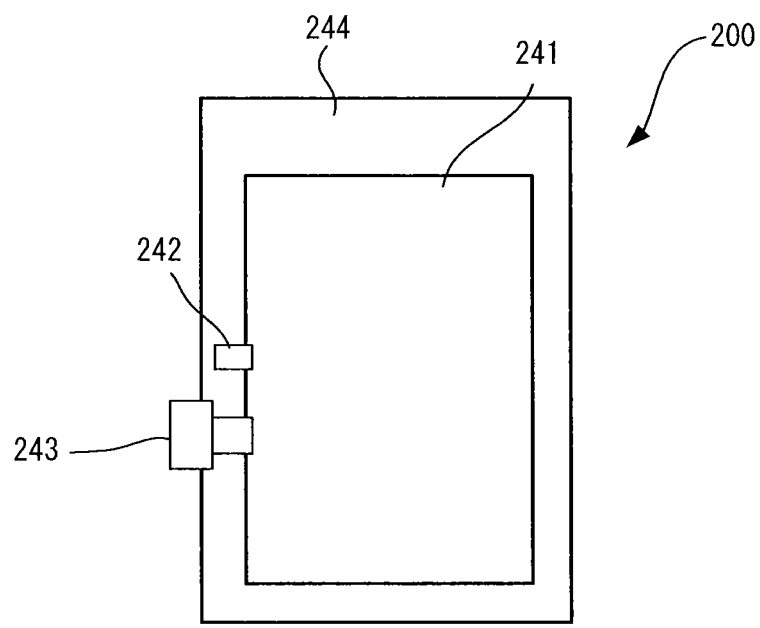
FIG. 2 is a schematic diagram of the ink cartridge of FIG. 1 including a case thereof.

Next, the ink cartridge is explained in reference to FIG. 1 and FIG. 2. Here, FIG. 1 is a diagram illustrating one example of the ink cartridge of the present invention, and FIG. 2 is a diagram of the ink cartridge of FIG. 1 with a case (exterior).

In an ink cartridge 200, as illustrated in FIG. 1, an ink is filled in an ink bag 241 from an ink inlet 242. After degassing, the ink inlet 242 is closed by fusing. In use, an ink outlet 243 made of a rubber member is pierced by a needle of an apparatus main body, and the ink is supplied to the apparatus.

The ink bag 241 is formed of a packaging material having no air permeability such as aluminum laminate film. As illustrated in FIG. 2, this ink bag 241 is usually contained in a plastic cartridge case 244 and is detachably mounted on various inkjet recording apparatuses.

The ink cartridge of the present invention contains the ink for inkjet recording of the present invention, and it may be detachably mounted and used on various inkjet recording apparatuses. It is particularly preferable to detachably mount and use it on an inkjet recording apparatus of the present invention described later.

(Inkjet Recording Apparatus and Inkjet Recording Method)

An inkjet recording apparatus of the present invention includes an ink-flying unit, and it further includes appropriately selected other units such as impulse-generating unit, inverting unit and control unit according to necessity.

An inkjet recording method used in the present invention includes an ink-flying step, and it further includes appropriately selected other steps such as impulse-generating step, inverting step and control step according to necessity.

The inkjet recording method used in the present invention may be favorably carried out by the inkjet recording apparatus of the present invention, and the ink-flying step may be favorably carried out by the ink-flying unit. In addition, the other steps may be favorably carried out by the other units.

<Ink-Flying Step and Ink-Flying Unit>

The ink-flying step is a step for applying an impulse on the ink for inkjet recording of the present invention to allow the ink for inkjet recording to fly so that an image is recorded.

The ink-flying unit is a unit for applying an impulse on the ink for inkjet recording of the present invention to allow the ink for inkjet recording to fly so that an image is recorded. The ink-flying unit is not particularly restricted, and examples thereof include a recording head including various nozzles for ink discharge.

In the present invention, it is preferable that a liquid chamber, a fluid-resistance portion, a diaphragm and a nozzle member of the recording head is at least partially formed of a material including silicon or nickel, or both thereof.

Also, the nozzle has a nozzle diameter of preferably 30 μm or less, and more preferably 1 μm to 20 μm.

The recording head preferably includes a nozzle plate with water-repellent treatment on an ink discharge surface thereof, the water-repellent treatment is preferably any one selected from PTFE-Ni co-deposition treatment, fluorine resin treatment and silicone resin treatment.

Also, it is preferable that the recording head includes a subtank for supplying the ink for inkjet recording and that the subtank is configured to have the ink for inkjet recording supplied from the ink cartridge via a supply tube.

The liquid droplets of the ink for inkjet recording which are allowed to fly have: a size of preferably 3 pL to 40 pL; a speed of the discharge jet of preferably 5 m/s to 20 m/s; a drive frequency of preferably 1 kHz or greater; and a resolution of preferably 300 dpi or greater.

<Other Steps and Other Units>

—Impulse Generating Step and Impulse-Generating Unit—

The impulse may be generated by the impulse-generating unit, for example. The impulse is not particularly restricted, and it may be appropriately selected according to purpose. Examples thereof include heat (temperature), pressure, vibration and light. These may be used alone or in combination of two or more. Among these, heat and pressure are favorable.

Examples of the impulse-generating unit include a heater, a pressurizer, a piezoelectric element, a vibration generator, an ultrasonic oscillator and a light. Specific examples thereof include: a piezo actuator such as piezoelectric element; a thermal actuator that utilizes a phase change due to film boiling of a liquid by using an electrothermal conversion element such as heating resistor; a shape-memory-alloy actuator that utilizes a metal phase change due to temperature change; and an electrostatic actuator that utilizes an electrostatic force.

An aspect of flying of the ink for inkjet recording is not particularly restricted, and it varies depending on types of the impulse and so on. For example, when the impulse is "heat", thermal energy corresponding to a recording signal is applied to the ink for inkjet recording in a recording head using a thermal head, for example. The thermal energy generates air bubbles in the ink for inkjet recording, and the pressure of the air bubbles discharges and jets the ink for inkjet recording as liquid droplets from nozzle holes of the recording head. Also, when the impulse is "pressure", a voltage is applied to a piezoelectric element bonded to a location called a pressure chamber present in an ink flow channel in a recording head. The pressure bends the piezoelectric element, reduces a volume of the pressure chamber and discharges and jets the ink for inkjet recording as liquid droplets from nozzle holes of the recording head.

—Inverting Step and Inverting Unit—

The inverting step is a step for inverting a recording surface of the recording medium to enable two-sided printing, and it is carried out by the inverting unit. The inverting unit is not particularly restricted, and it may be appropriately selected according to purpose. Examples thereof include: a conveying belt having an electrostatic force, a unit for holding a recording medium by air suction, a combination of a conveying roller and a spur.

It preferably includes an endless conveying belt and a conveying unit for conveying a recording medium while charging a surface of the conveying belt and holding the recording medium. In this case, it is particularly preferable to charge the conveying belt by applying an AC bias of ±1.2 kV to ±2.6 kV to a charging roller.

—Control Step and Control Unit—

The control step is a step for controlling operations in various steps, and it may be carried out by the control unit. The control unit is not particularly restricted, and it may be appropriately selected according to purpose. Examples thereof include a sequencer and a computer.

One aspect of carrying out the inkjet recording method used in the present invention by the inkjet recording apparatus of the present invention is explained in reference to diagrams.

Figure 3:
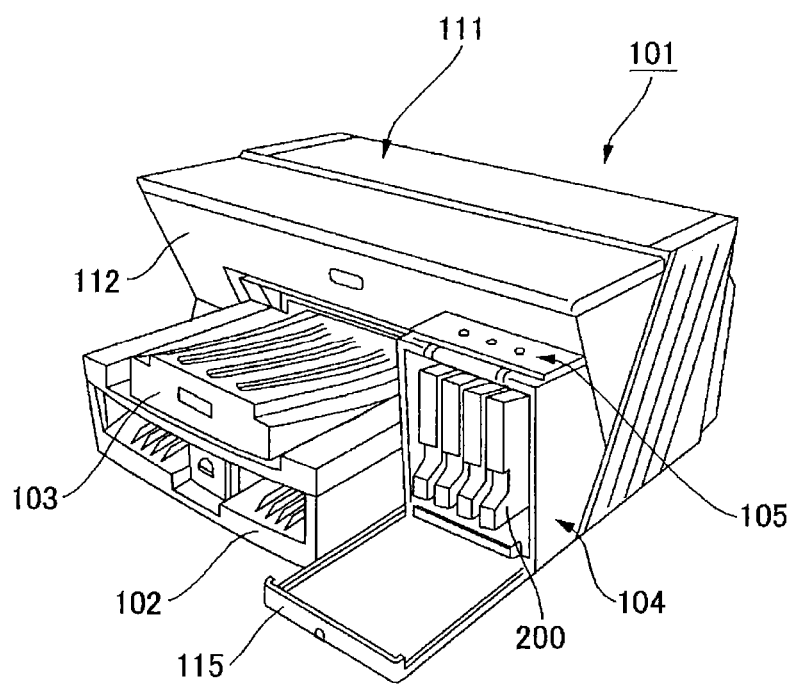
FIG. 3 is a perspective view illustrating an ink cartridge loading unit of an inkjet recording apparatus with its cover open.

An inkjet recording apparatus illustrated in FIG. 3 includes: an apparatus main body 101; a paper-feed tray 102 for loading sheets mounted on the apparatus main body 101; a discharge tray 103 for stocking sheets which is mounted on apparatus main body 101 and has an image recorded (formed) thereon; and an ink cartridge loading unit 104. An operating portion 105 such as operation keys and indicators are arranged on an upper surface of the ink cartridge loading unit 104. The ink cartridge loading unit 104 includes an openable front cover 115 for loading and unloading an ink cartridge 200. In FIG. 3, reference numerals 111 and 112 denote a top cover and a front of a front cover, respectively.

Figure 4:
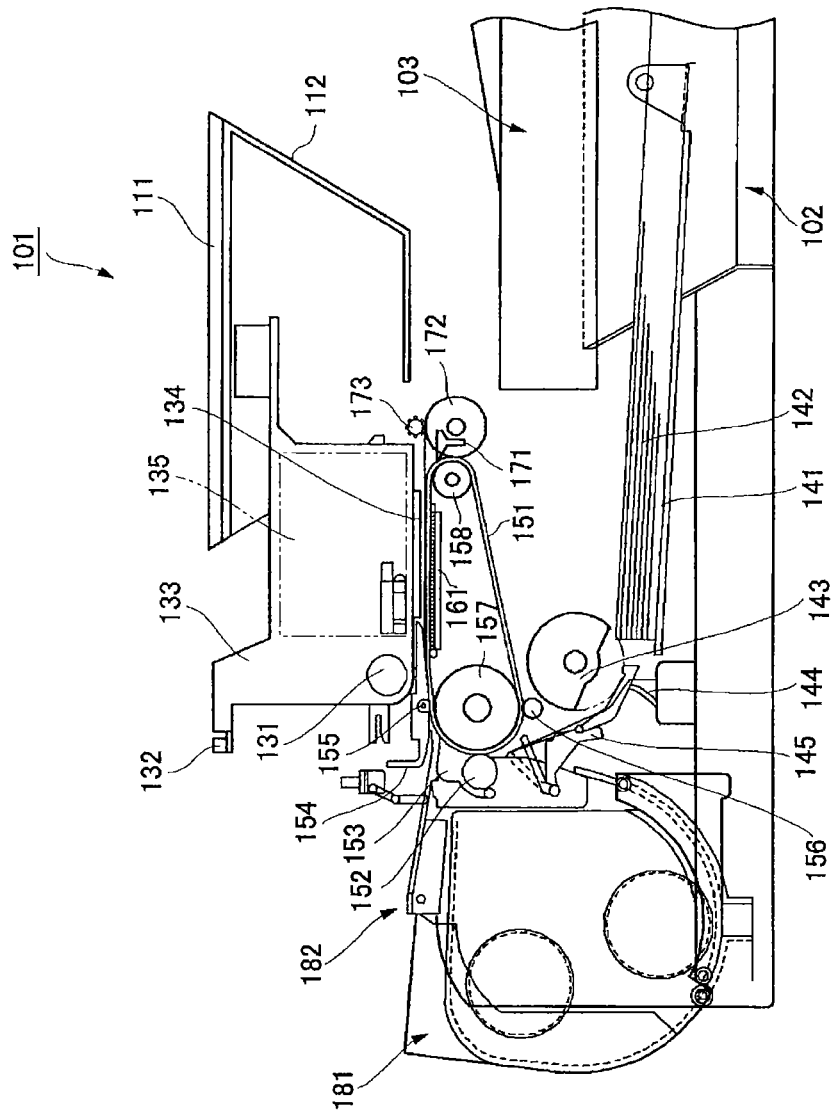
FIG. 4 is a schematic configuration diagram illustrating overall configuration of an inkjet recording apparatus.

In the apparatus main body 101, as illustrated in FIG. 4, a carriage 133 is slidably held in a main scanning direction by a guide rod 131 and a stay 132 as guide members stretched to sides of left and right side plates (not shown), and it moves and scans by a main scanning motor (not shown).

In the carriage 133, a plurality of ink discharge ports of a discharge recording head 134 composed of four (4) inkjet recording heads which respectively discharge ink droplets of yellow (Y), cyan (C), magenta (M) and black (Bk) are arranged in a direction intersecting with the main scanning direction and are loaded with an ink droplets discharge direction downward.

Those which may be used as the inkjet recording head which constitutes the recording head 134 is equipped with an energy generating unit for discharging an ink, examples thereof including: a piezo actuator such as piezoelectric element; a thermal actuator that utilizes a phase change due to film boiling of a liquid by using an electrothermal conversion element such as heating resistor; a shape-memory-alloy actuator that utilizes a metal phase change due to temperature change; and an electrostatic actuator that utilizes an electrostatic force.

Also, subtanks 135 of respective colors are installed in the carriage 133 for supplying inks of the respective colors to the recording head 134. The subtanks 135 are replenished with the inks supplied from the ink cartridges of the present invention 200 mounted on the ink cartridge loading section 104 via an ink supply tube (not shown).

Meanwhile, as a paper-feeding unit for feeding sheets 142 loaded on a paper-stacking unit (pressure plate) 141 of the paper feed tray 102, there are a half-moon roller [paper feed roller 143], which feeds one sheet at a time from the sheets 142 in the sheet stacking unit 141, and a separation pad 144 composed of a material having a high frictional coefficient, facing the paper feed roller 143. This separation pad 144 is biased to the paper feed roller 143.

As a conveying unit for conveying the sheet 142 fed from this paper-feeding unit in a downstream side of the recording head 134, the apparatus includes: a conveying belt 151 for conveying the sheet 142 by electrostatic adsorption; a counter roller 152 for conveying the sheet 142 send from the paper feed unit via a guide 145 by sandwiching it with the conveying belt 151; a conveyance guide 153 for having the sheet 142 sent in a substantially vertical and upward direction follow the conveying belt 151 by diverting it approximately by 90°; and a front pressure roller 155 biased to the conveying belt 151 by a pressing member 154, and it also includes a charging roller 156 as a charging unit for charging a surface of the conveying belt 151.

The conveying belt 151 is an endless belt stretched between a conveying roller 157 and a tension roller 158, and it may circulate in a conveying direction of the belt. This conveying belt 151 includes, for example: a surface layer as a sheet adsorbing surface formed of a resin material having a thickness of 40 μm without resistivity control, e.g. a copolymer of tetrafluoroethylene and ethylene (ETFE); and a back layer (a medium resistance layer, a grounded layer) made of this surface layer but with resistivity control with carbon. Behind the conveying belt 151, a guiding member 161 is arranged, corresponding to an imaging region by the recording head 134. Here, as a paper discharge unit for discharging the sheet 142 on which recording has been carried out with the recording head 134, there are a separation claw 171 for separating the sheet 142 from the conveying belt 151, a discharge roller 172 and a discharge roller 173, and the discharge tray 103 is arranged in a downstream of the discharge roller 172.

On a back of the apparatus body 101, a two-side paper-feeding unit 181 is detachably mounted. The two-side paper-feeding unit 181 captures and inverts the sheet 142 returned by the conveying belt 151 rotating in a reverse direction to feed it again between the counter roller 152 and the conveying belt 151. Here, on a top surface of the two-side paper-feeding unit 181, a manual paper-feeding unit 182 is disposed.

In this inkjet recording apparatus, the sheet 142 is separated one by one and fed from paper feed unit, and the sheet 142 fed in a substantially vertical and upward direction is guided by the guide 145 and conveyed while sandwiched between the conveying belt 151 and the counter roller 152. Further, a tip thereof is guided by the conveyance guide 153 and pressed against the conveying belt 151 by the front pressure roller 155, and its conveying direction is diverted approximately by 90°.

At this time, the conveying belt 157 is charged by the charging roller 156, and the sheet 142 is electrostatically adsorbed and conveyed by the conveying belt 151. Here, by driving the recording head 134 by moving the carriage 133 in accordance with an image signal, ink droplets are discharged to the sheet 142 being stopped to record one line. After the sheet 142 is conveyed by a predetermined amount, recording of a next line is carried out. By receiving a recording end signal or a signal that a rear end of the sheet 142 has reached the recording area, the recording operation is terminated, and the sheet 142 is discharged in the discharge tray 103.

Then, when the ink remaining in the subtank 135 is detected to be nearly empty, a required amount of the ink is supplied from the ink cartridge 200 to the subtank 135.

In this inkjet recording apparatus, when the ink in the ink cartridge 200 is nm out, it is possible to replace only the ink bag inside by decomposing a housing of the ink cartridge 200. Also, the ink cartridge 200 may supply the ink in a stable manner even when it is arranged vertically in a front-loading configuration. Thus, in a case where a top of the apparatus body 101 is blocked, e.g. the apparatus is arranged in a rack or an object is placed on a top surface of the apparatus body 101, the ink cartridge 200 may be easily exchanged.

Here, the example of a serial-type (shuttle-type) inkjet recording apparatus in which a carriage scans is explained above, but it is similarly applied to a line-type inkjet recording apparatus equipped with a line-type head.

The inkjet recording apparatus and the inkjet recording method of the present invention are applicable to various inkjet recording, and they may be particularly favorably applied to, for example, an inkjet recording printer, a facsimile, a copier, a printer/facsimile/copier multifunction machine and so on.

<Ink Recorded Matter>

An ink recorded matter used in the present invention includes an image formed on a recording medium using the ink for inkjet recording of the present invention.

—Recording Medium—

The recording medium is not particularly restricted, and it may be appropriately selected according to purpose. For example, both a recording medium having absorbency to an ink for inkjet recording such as paper and a recording medium having substantially no absorbency to an ink for inkjet recording are favorably used.

Examples of the recording medium include; a plastic sheet having polyethylene terephthalate, polycarbonate, polypropylene, polyethylene, polysulfone, an ABS resin, polyvinyl chloride and so on as a substrate; a metal-coated recording medium by a method such as vapor deposition on a surface of a metal such as brass, iron, aluminum, stainless steel (SUS) and copper or a non-metal substrate; a recording medium including paper as a substrate subjected to a water-repellent treatment; and a recording medium of a so-called ceramics material that an inorganic material has been baked at a high temperature. Among these, paper is preferable since it is economical and provides naturalness to an image. In the present invention, both smooth paper and non-smooth paper are favorably used.

The smoothness of the paper is measured, and according to the smoothness, the paper as the recording medium may be classified into smooth paper and non-smooth paper.

The non-smooth paper has the smoothness of less than 500 seconds, and it is plain paper without treatment such as surface coating.

The smooth paper, which is often with surface coating treatment, has the smoothness of 500 seconds or greater, and examples thereof include gloss paper such as art paper and cast-coated paper.

The smoothness may be measured with an Oken measuring instrument, for example. That is, a hollow head is placed on paper, and a pressure inside is reduced. The smoothness is measured by the time (seconds) that a certain amount of air flows through a gap between the paper and the head.

EXAMPLES

Hereinafter, the present invention is explained with reference to examples, which however shall not be construed as limiting the scope of the present invention. In the examples below, various physical properties of carbon black and carbon black dispersions were measured as follows.

<BET Specific Surface Area of Carbon Black>

A BET specific surface area of carbon black was measured according to a BET method by adsorption of nitrogen (DIN 66132).

<Volatile Matter Content of Carbon Black>

The volatile matter content of the carbon black was measured according to a method described in DIN 53 552. Specifically, a dried sample of the carbon black was stuffed with vibration and strokes in a platinum crucible or a porcelain crucible with lid that could be placed deep inside the crucible having the same shape and the same volume as the platinum crucible to an extent of not exceeding 2 mm below the lid, and a mass thereof ($W_D$) was weighed. Next, the lid was placed on the crucible, and the crucible was placed in an electric furnace and heated at 950° C.±25° C. for exactly 7 minutes. Then, it was taken out and allowed to cool in a desiccator until it reached a room temperature (25° C.), and a mass after heating ($W_R$) was weighed. A value (V) obtained by applying these masses to the following formula is the volatile matter content (% by mass).

$$V = \frac{W_D - W_R}{W_D} \times 100$$

where, in the formula, V denotes the volatile matter content of the carbon black (% by mass); $W_D$ denotes the mass of the dried sample (g); $W_R$ denotes the mass of the sample after heating (g).

<pH of Carbon Black>

A pH of the carbon black was measured according to a method described in JIS K6220-1.

<50% Cumulative Particle Size and Standard Deviation in Volume-Based Particle Size Distribution (D50) of Carbon Black in Carbon Black Dispersion and Ink>

A 50% cumulative particle size in a volume-based particle size distribution (D50) of carbon black (oxidized carbon black+resin-coated carbon black) in the carbon black dispersion and the ink was measured as follows.

Measuring instrument: Particle size distribution analyzer UPA150, manufactured by Nikkiso Co., Ltd.

Measurement Conditions:

(1) Solid concentration of test solution: 0.1% by mass water solvent (2) Transparent Particles: Yes (3) Spherical Particles: No (4) Part. Refractive Index: 1.86

(5) Part. Density: 1.86 (gm/cm$^3$)

(6) Fluid: Default Fluid (7) Fluid Refractive Index: 1.33

(8) Viscosity High 30° C.: 0.797 cp (9) Viscosity Low 20° C.: 1.002 cp

(10) Display Format: Volume distribution

(11) Measured ambient temperature: 22° C.

(Production Example of Oxidized Carbon Black Dispersion 1)

<Preparation of Oxidized Carbon Black Dispersion 1-1>

—Preparation of Oxidized Carbon Black 1—

First, 200 g of carbon black (PRINTEX-U, manufactured by Evonik Degussa Japan Co., Ltd.) was placed in a cylindrical ozone processor. Then, with ozone generated at 6 g/hour in an ozone generator (KQS-120, manufactured by Kotohira Kogyo Co., Ltd), it was subjected to an ozone oxidation treatment for 2.5 hours under the ozone atmosphere while a treatment temperature was maintained at 30° C. Thereby, Oxidized Carbon Black 1 was obtained.

Obtained Oxidized Carbon Black 1 had a volatile matter content of 10.3% by mass, a BET specific surface area of 110 m²/g and a pH of 3.0.

—Preparation of Oxidized Carbon Black Dispersion 1-1—
Oxidized Carbon Black 1 . . . 20.0 parts by mass
Distilled water . . . 70.0 parts by mass The materials formulated above were pre-mixed, and a total content thereof was adjusted to 100 parts by mass with further addition of distilled water. Thereafter, it was dispersed at a peripheral speed of 8 m/second and a liquid temperature of 10° C. for 7 minutes in a disc-type bead mill (KDL of batch type, manufactured by Shinmaru Enterprises Corporation) using 0.2-mm zirconia beads.

Coarse particles were separated by a centrifuge (Model-3600, sold by Kubota Corporation). Thereby, Oxidized Carbon Black Dispersion 1-1 (carbon black concentration of 20% by mass) having a 50% cumulative particle size in a volume-based particle size distribution (D50) of 115 nm and a standard deviation of 45.3 nm was obtained.

(Production Examples of Oxidized Carbon Black Dispersions 2 to 3, 15 to 16)

Oxidized Carbon Blacks 2 to 3, 10 to 11 in Table 1 were prepared in the same manner as Production Example of Oxidized Carbon Black Dispersion 1 except that the ozone generated amount and the ozone oxidation treatment time in Production Example of Oxidized Carbon Black Dispersion 1 were adjusted to those in Table 1.

Next, Oxidized Carbon Black Dispersions 1-2 to 1-3, 1-15 to 1-16 (carbon black concentration of 20% by mass) of Table 1 were prepared in the same manner as Production Example of Oxidized Carbon Black Dispersion 1 except that Oxidized Carbon Black 1 in Production Example of Oxidized Carbon Black Dispersion 1 was replaced by Oxidized Carbon Black 2 to 3, 10 to 11, respectively.

(Production Example of Oxidized Carbon Black Dispersion 4)

Oxidized Carbon Black 4 and Oxidized Carbon Black Dispersion 1-4 (carbon black concentration of 20% by mass) in Table 1 were prepared in the same manner as Production Example of Oxidized Carbon Black Dispersion 1 except that the carbon black (PRINTEX-U, manufactured by Evonik Degussa Japan Co., Ltd.) in Production Example of Oxidized Carbon Black Dispersion 1 was replaced by carbon black (NIPEX160, manufactured by Evonik Degussa Japan Co., Ltd.).

(Production Example of Oxidized Carbon Black Dispersion 5)

Oxidized Carbon Black 5 and Oxidized Carbon Black Dispersion 1-5 (carbon black concentration of 20% by mass) in Table 1 were prepared in the same manner as Production Example of Oxidized Carbon Black Dispersion 2 except that the carbon black (PRINTEX-U, manufactured by Evonik Degussa Japan Co., Ltd.) in Production Example of Oxidized Carbon Black Dispersion 2 was replaced by carbon black (NIPEX160, manufactured by Evonik Degussa Japan Co., Ltd.).

(Production Example of Oxidized Carbon Black Dispersion 6)

Oxidized Carbon Black 6 and Oxidized Carbon Black Dispersion 1-6 (carbon black concentration of 20% by mass) in Table 1 were prepared in the same manner as Production Example of Oxidized Carbon Black Dispersion 3 except that the carbon black (PRINTEX-U, manufactured by Evonik Degussa Japan Co., Ltd.) in Production Example of Oxidized Carbon Black Dispersion 3 was replaced by carbon black (NIPEX160, manufactured by Evonik Degussa Japan Co., Ltd.).

(Production Example of Oxidized Carbon Black Dispersion 7)

Oxidized Carbon Black 7 and Oxidized Carbon Black Dispersion 1-7 in Table 1 were prepared in the same manner as Production Example of Oxidized Carbon Black Dispersion 1 except that the carbon black (PRINTEX-U, manufactured by Evonik Degussa Japan Co., Ltd.) in Production Example of Oxidized Carbon Black Dispersion 1 was replaced by carbon black (PRINTEX140, manufactured by Evonik Degussa Japan Co., Ltd.).

(Production Example of Oxidized Carbon Black Dispersion 8)

Oxidized Carbon Black 8 and Oxidized Carbon Black Dispersion 1-8 in Table 1 were prepared in the same manner as Production Example of Oxidized Carbon Black Dispersion 2 except that the carbon black (PRINTEX-U, manufactured by Evonik Degussa Japan Co., Ltd.) in Production Example of Oxidized Carbon Black Dispersion 2 was replaced by carbon black (PRINTEX140, manufactured by Evonik Degussa Japan Co., Ltd.).

(Production Example of Oxidized Carbon Black Dispersion 9)

Oxidized Carbon Black 9 and Oxidized Carbon Black Dispersion 1-9 in Table 1 were prepared in the same manner as Production Example of Oxidized Carbon Black Dispersion 3 except that the carbon black (PRINTEX-U, manufactured by Evonik Degussa Japan Co., Ltd.) in Production Example of Oxidized Carbon Black Dispersion 3 was replaced by carbon black (PRINTEX140, manufactured by Evonik Degussa Japan Co., Ltd.).

(Production Example of Oxidized Carbon Black Dispersion 10)

Oxidized Carbon Black 1 . . . 20.0 parts by mass
Distilled water . . . 70.0 parts by mass The materials formulated above were pre-mixed. In order to form a salt of a carboxyl group on a surface of the carbon black, an aminoethylpropanediol aqueous solution (solid content of 2% by mass) was added dropwise to the formulation so that its pH was 7. Then, distilled water was added to adjust the formulation to 100 parts by mass in total.

A dropped amount of the aminoethylpropanediol aqueous solution was 8.9 g. Thereafter, it was dispersed at a peripheral speed of 10 m/second and a liquid temperature of 10° C. for 5 minutes in a disc-type bead mill (KDL of batch type, manufactured by Shinmaru Enterprises Corporation) using 0.3-mm zirconia beads.

Coarse particles were separated by a centrifuge (Model-3600, sold by Kubota Corporation). Thereby, a pigment dispersion of Oxidized Carbon Black Dispersion 1-10 having a 50% cumulative particle size in a volume-based particle size distribution (D50) of 140 nm and a standard deviation of 70 nm was obtained.

(Production Example of Oxidized Carbon Black Dispersion 11)

Oxidized Carbon Black Dispersion 1-11 in Table 1 was prepared in the same manner as Production Example of Oxidized Carbon Black Dispersion 10 except that the pH was adjusted to 7 with the aminoethylpropanediol aqueous solution (solid content of 20% by mass) in Production Example of Oxidized Carbon Black Dispersion 10 replaced by a triethanolamine aqueous solution (solid content of 20% by mass).

(Production Example of Oxidized Carbon Black Dispersion 12)

Oxidized Carbon Black Dispersion 1-12 in Table 1 was prepared in the same manner as Production Example of Oxidized Carbon Black Dispersion 10 except that the pH was adjusted to 7 with the aminoethylpropanediol aqueous solution (solid content of 20% by mass) in Production Example of Oxidized Carbon Black Dispersion 10 replaced by a 20-% by mass aqueous solution of NaOH.

(Production Example of Oxidized Carbon Black Dispersion 13)

Oxidized Carbon Black Dispersion 1-13 in Table 1 was prepared in the same manner as Production Example of Oxidized Carbon Black Dispersion 10 except that the pH was adjusted to 7 with the aminoethylpropanediol aqueous solution (solid content of 20% by mass) in Production Example of Oxidized Carbon Black Dispersion 10 replaced by a 10-% by mass aqueous solution of LiOH.

(Production Example of Oxidized Carbon Black Dispersion 14)

Oxidized Carbon Black Dispersion 1-14 in Table 1 was prepared in the same manner as Production Example of Oxidized Carbon Black Dispersion 10 except that the pH was adjusted to 7 with the aminoethylpropanediol aqueous solution (solid content of 20% by mass) in Production Example of Oxidized Carbon Black Dispersion 10 replaced by a 10-% by mass aqueous solution of KOH.

(Production Example of Oxidized Carbon Black Dispersion 17)

Oxidized Carbon Black 12 and Oxidized Carbon Black Dispersion 1-17 in Table 1 were prepared in the same manner as Production Example of Oxidized Carbon Black Dispersion 1 except that the carbon black (PRINTEX-U, manufactured by Evonik Degussa Japan Co., Ltd.) in Production Example of Oxidized Carbon Black Dispersion 1 was replaced by carbon black (PRINTEX-35, manufactured by Evonik Degussa Japan Co., Ltd.).

(Production Example of Oxidized Carbon Black Dispersion 18)

Oxidized Carbon Black 13 and Oxidized Carbon Black Dispersion 1-18 in Table 1 were prepared in the same manner as Production Example of Oxidized Carbon Black Dispersion 1 except that the carbon black (PRINTEX-U, manufactured by Evonik Degussa Japan Co., Ltd.) in Production Example of Oxidized Carbon Black Dispersion 1 was replaced by carbon black (PRINTEX-85, manufactured by Evonik Degussa Japan Co., Ltd.).

(Production Example of Oxidized Carbon Black Dispersion 19)

First, 100 g of carbon black (PRINTEX-U, manufactured by Evonik Degussa Japan Co., Ltd.) was mixed with 500 g of distilled water. Then, 1,000 g of a sodium hypochlorite solution (12% by mass) was added dropwise to the mixture with stirring, which was boiled for 6 hours and subjected to wet oxidation. Thereafter, it was filtered by a glass fiber filter, further washed with distilled water and dried in a high-temperature vessel at 100° C. Thereby, Oxidized Carbon Black 14 was prepared.

Obtained Oxidized Carbon Black 14 had a measured volatile matter content of the carbon black of 13% by mass. Also, a BET specific surface area thereof was 110 m²/g.

Next, Oxidized Carbon Black Dispersion 1-19 in Table 1 (carbon black concentration of 20% by mass) was prepared in the same manner as Production Example of Oxidized Carbon Black Dispersion 1 except that Oxidized Carbon Black 1 in Production Example of Oxidized Carbon Black Dispersion 1 was replaced by Oxidized Carbon Black 14.

(Production Example of Oxidized Carbon Black Dispersion 20)

First, 100 g of carbon black (PRINTEX-U, manufactured by Evonik Degussa Japan Co., Ltd.) was mixed with 500 g of distilled water. Then, 600 g of a sodium peroxodisulfate solution (10% by mass) was added dropwise to the mixture with stirring, which was boiled for 6 hours and subjected to wet oxidation. Thereafter, it was filtered by a glass fiber filter, further washed with distilled water and dried in a high-temperature vessel at 100° C. Thereby, Oxidized Carbon Black 15 was prepared.

Obtained Oxidized Carbon Black 15 had a measured volatile matter content of the carbon black of 13% by mass. Also, a BET specific surface area thereof was 110 m²/g.

Next, Oxidized Carbon Black Dispersion 1-20 in Table 1 (carbon black concentration of 20% by mass) was prepared in the same manner as Production Example of Oxidized Carbon Black Dispersion 1 except that Oxidized Carbon Black 1 in Production Example of Oxidized Carbon Black Dispersion 1 was replaced by Oxidized Carbon Black 15.

(Production Example of Oxidized Carbon Black Dispersion 21)

Oxidized Carbon Black 16 and Oxidized Carbon Black Dispersion 1-21 in Table 1 were prepared in the same manner as Production Example of Oxidized Carbon Black Dispersion 1 except that the carbon black (PRINTEX-U, manufactured by Degussa) in Production Example of Oxidized Carbon Black Dispersion 1 was replaced by carbon black (PRINTEX-300, manufactured by Evonik Degussa Japan Co., Ltd.).

(Production Example of Oxidized Carbon Black Dispersion 22)

Oxidized Carbon Black 17 and Oxidized Carbon Black Dispersion 1-22 in Table 1 were prepared in the same manner as Production Example of Oxidized Carbon Black Dispersion 1 except that the carbon black (PRINTEX-U, manufactured by Evonik Degussa Japan Co., Ltd.) in Production Example of Oxidized Carbon Black Dispersion 1 was replaced by carbon black (PRINTEX-75, manufactured by Evonik Degussa Japan Co., Ltd.).

(Production Example of Oxidized Carbon Black Dispersion 23)

Oxidized Carbon Black Dispersion 1-23 having a 50% cumulative particle size in a volume-based particle size distribution (D50) of 107 nm (carbon black concentration of 20% by mass) was obtained in the same manner as Production Example of Oxidized Carbon Black Dispersion 1 except that the dispersion in Production Example of Oxidized Carbon Black Dispersion 1 was carried out at a peripheral speed of 8 m/second and a liquid temperature of 10° C. for 15 minutes using a 0.2-mm zirconia beads.

(Production Example of Oxidized Carbon Black Dispersion 24)

Oxidized Carbon Black Dispersion 1-24 having a 50% cumulative particle size in a volume-based particle size distribution (D50) of 189 nm (carbon black concentration of 20% by mass) was obtained in the same manner as Production Example of Oxidized Carbon Black Dispersion 1 except that the dispersion in Production Example of Oxidized Carbon Black Dispersion 1 was carried out at a peripheral speed of 8 m/second and a liquid temperature of 10° C. for 3 minutes using 0.2-mm zirconia beads.

TABLE 1

| | Oxidized Carbon Black No. | Carbon black before oxidation | Oxidization method | Ozone generated amount (g/hour) | Ozone oxidation treatment time (hour) | Ozone oxidation treatment temperature (° C.) |
|---|---|---|---|---|---|---|
| Prod. Ex. 1 | 1 | PRINTEX-U | ozone | 6 | 2.5 | 30 |
| Prod. Ex. 2 | 2 | PRINTEX-U | ozone | 8 | 3.0 | 30 |
| Prod. Ex. 3 | 3 | PRINTEX-U | ozone | 12 | 3.5 | 30 |
| Prod. Ex. 4 | 4 | NIPEX160 | ozone | 6 | 2.5 | 30 |
| Prod. Ex. 5 | 5 | NIPEX160 | ozone | 8 | 3.0 | 30 |
| Prod. Ex. 6 | 6 | NIPEX160 | ozone | 12 | 3.5 | 30 |
| Prod. Ex. 7 | 7 | PRINTEX140 | ozone | 6 | 2.5 | 30 |
| Prod. Ex. 8 | 8 | PRINTEX140 | ozone | 8 | 3.0 | 30 |
| Prod. Ex. 9 | 9 | PRINTEX140 | ozone | 12 | 3.5 | 30 |
| Prod. Ex. 10 | 1 | PRINTEX-U | ozone | 6 | 2.5 | 30 |
| Prod. Ex. 11 | 1 | PRINTEX-U | ozone | 6 | 2.5 | 30 |
| Prod. Ex. 12 | 1 | PRINTEX-U | ozone | 6 | 2.5 | 30 |
| Prod. Ex. 13 | 1 | PRINTEX-U | ozone | 6 | 2.5 | 30 |
| Prod. Ex. 14 | 1 | PRINTEX-U | ozone | 6 | 2.5 | 30 |
| Prod. Ex. 15 | 10 | PRINTEX-U | ozone | 4 | 2.0 | 30 |
| Prod. Ex. 16 | 11 | PRINTEX-U | ozone | 15 | 3.5 | 30 |
| Prod. Ex. 17 | 12 | PRINTEX-35 | ozone | 8 | 3.0 | 30 |
| Prod. Ex. 18 | 13 | PRINTEX-85 | ozone | 8 | 3.0 | 30 |
| Prod. Ex. 19 | 14 | PRINTEX-U | sodium hypochlorite | — | — | — |
| Prod. Ex. 20 | 15 | PRINTEX-U | sodium peroxodisulfate | — | — | — |
| Prod. Ex. 21 | 16 | PRINTEX-300 | ozone | 8 | 3.0 | 30 |
| Prod. Ex. 22 | 17 | PRINTEX-75 | ozone | 8 | 3.0 | 30 |
| Prod. Ex. 23 | 1 | PRINTEX-U | ozone | 6 | 2.5 | 30 |
| Prod. Ex. 24 | 1 | PRINTEX-U | ozone | 6 | 2.5 | 30 |

| | Oxidized Carbon Black No. | volatile matter content of the carbon black (% by mass) | BET specific surface area ($m^2/g$) | pH |
|---|---|---|---|---|
| Prod. Ex. 1 | 1 | 10.3 | 110 | 3 |
| Prod. Ex. 2 | 2 | 13.0 | 110 | 2.6 |
| Prod. Ex. 3 | 3 | 20.0 | 110 | 2.2 |
| Prod. Ex. 4 | 4 | 10.0 | 150 | 2.8 |
| Prod. Ex. 5 | 5 | 13.0 | 150 | 2.4 |
| Prod. Ex. 6 | 6 | 20.0 | 150 | 2.1 |
| Prod. Ex. 7 | 7 | 10.0 | 90 | 3.1 |
| Prod. Ex. 8 | 8 | 13.0 | 90 | 2.8 |
| Prod. Ex. 9 | 9 | 20.0 | 90 | 2.4 |
| Prod. Ex. 10 | 1 | 10.3 | 110 | 3 |
| Prod. Ex. 11 | 1 | 10.3 | 110 | 3 |
| Prod. Ex. 12 | 1 | 10.3 | 110 | 3 |
| Prod. Ex. 13 | 1 | 10.3 | 110 | 3 |
| Prod. Ex. 14 | 1 | 10.3 | 110 | 3 |
| Prod. Ex. 15 | 10 | 9.0 | 110 | 3 |
| Prod. Ex. 16 | 11 | 21.0 | 110 | 2.4 |
| Prod. Ex. 17 | 12 | 13.0 | 65 | 2.6 |
| Prod. Ex. 18 | 13 | 13.0 | 200 | 2.6 |
| Prod. Ex. 19 | 14 | 13.0 | 110 | 2.6 |
| Prod. Ex. 20 | 15 | 13.0 | 110 | 2.6 |
| Prod. Ex. 21 | 16 | 13.0 | 83 | 2.6 |
| Prod. Ex. 22 | 17 | 13.0 | 158 | 2.6 |
| Prod. Ex. 23 | 1 | 10.3 | 110 | 3 |
| Prod. Ex. 24 | 1 | 10.3 | 110 | 3 |

| | Oxidized Carbon Black Dispersion No. | Oxidized Carbon Black No. | Base added | pH of dispersion |
|---|---|---|---|---|
| Prod. Ex. 1 | 1-1 | 1 | None | 7 |
| Prod. Ex. 2 | 1-2 | 2 | None | 7 |
| Prod. Ex. 3 | 1-3 | 3 | None | 7 |
| Prod. Ex. 4 | 1-4 | 4 | None | 7 |
| Prod. Ex. 5 | 1-5 | 5 | None | 7 |
| Prod. Ex. 6 | 1-6 | 6 | None | 7 |
| Prod. Ex. 7 | 1-7 | 7 | None | 7 |
| Prod. Ex. 8 | 1-8 | 8 | None | 7 |
| Prod. Ex. 9 | 1-9 | 9 | None | 7 |
| Prod. Ex. 10 | 1-10 | 1 | aminoethylpropanediol | 7 |
| Prod. Ex. 11 | 1-11 | 1 | triethanolamine | 7 |
| Prod. Ex. 12 | 1-12 | 1 | NaOH | 7 |
| Prod. Ex. 13 | 1-13 | 1 | LiOH | 7 |
| Prod. Ex. 14 | 1-14 | 1 | KOH | 7 |

TABLE 1-continued

| | | | | |
|---|---|---|---|---|
| Prod. Ex. 15 | 1-15 | 10 | None | 7 |
| Prod. Ex. 16 | 1-16 | 11 | None | 7 |
| Prod. Ex. 17 | 1-17 | 12 | None | 7 |
| Prod. Ex. 18 | 1-18 | 13 | None | 7 |
| Prod. Ex. 19 | 1-19 | 14 | None | 7 |
| Prod. Ex. 20 | 1-20 | 15 | None | 7 |
| Prod. Ex. 21 | 1-21 | 16 | None | 7 |
| Prod. Ex. 22 | 1-22 | 17 | None | 7 |
| Prod. Ex. 23 | 1-23 | 1 | None | 7 |
| Prod. Ex. 24 | 1-24 | 1 | None | 7 |

(Production Example of Resin-Coated Carbon Black Dispersion 1)
<Preparation of Resin-Coated Carbon Black Dispersion 2-1>
—Synthesis of Polymer Dispersion—

A 1-L flask equipped with a mechanical stirrer, a thermometer, a nitrogen gas inlet tube, a reflux tube and a dropping funnel was sufficiently purged with nitrogen gas, then charged with: 11.2 g of styrene; 2.8 g of acrylic acid; 12.0 g of lauryl methacrylate; 4.0 g of polyethylene glycol methacrylate; 4.0 g of a styrene macromer (product name: AS-6, manufactured by Toagosei Co., Ltd.); and 0.4 g of mercaptoethanol, and heated to 65° C.

Next, a mixed solution, which contains: 100.8 g of styrene; 25.2 g of acrylic acid; 108.0 g of lauryl methacrylate; 36.0 g of polyethylene glycol methacrylate; 60.0 g of hydroxyethyl methacrylate; 36.0 g of a styrene macromer (product name: AS-6, manufactured by Toagosei Co., Ltd.); 3.6 g of mercaptoethanol; 2.4 g of azobisdimethylvaleronitrile; and 18 g of methyl ethyl ketone, was added dropwise in the flask over 2.5 hours. After completion of the dropwise addition, a mixed solution containing 0.8 g of azobisdimethylvaleronitrile and 18 g of methyl ethyl ketone was added dropwise in the flask over 0.5 hours. It was aged at 65° C. for 1 hour. Then, 0.8 g of azobisdimethylvaleronitrile was added, and it was further aged for 1 hour. After completion of reaction, 364 g of methyl ethyl ketone was added in the flask, and 800 g of a polymer dispersion having a concentration of 50% by mass was prepared.

—Preparation of Resin-Coated Carbon Black Dispersion 2-1—

First, 28 g of the synthesized polymer dispersion, 40 g of carbon black (carbon black #960, manufactured by Mitsubishi Chemical Corporation), 13.6 g of a 1-mol/L potassium hydroxide solution, 20 g of methyl ethyl ketone and 30 g of ion-exchanged water were sufficiently stirred and then kneaded using a three-roll mill. An obtained paste was added to 200 g of ion-exchanged water and sufficiently mixed, and then, methyl ethyl ketone and water were distilled using an evaporator. Thereby, Resin-Coated Carbon Black Dispersion 2-1 (carbon black concentration of 20% by mass) having a 50% cumulative particle size in a volume-based particle size distribution (D50) of 62 nm was prepared.

(Production Example of Resin-Coated Carbon Black Dispersion 2)
<Preparation of Resin-Coated Carbon Black Dispersion 2-2>
—Synthesis of Polymer Dispersion—

A reactor was charged with 20 parts by mass of methyl ethyl ketone, 0.03 parts by mass of a polymerization chain transfer agent (2-mercaptoethanol), and 10% by mass of 200 parts by mass in total of a monomer mixture containing: benzyl methacrylate/(a) methacrylic acid/(b) styrene macromer (product name: AS-6, manufactured by Toagosei Co., Ltd.)/(e) polyethylene glycol methacrylate 2-ethylhexyl ether (NK ESTER EH-4G, manufactured by Shin Nakamura Chemical Co., Ltd.) with an effective content mass ratio of 44/16/15/25, and the content was sufficiently mixed. It was sufficiently purged with nitrogen gas, and a mixed solution was obtained.

Meanwhile, a dropping funnel was charged with the remaining 90% by mass of the monomer mixture. Then, 0.27 parts by mass of the polymerization chain transfer agent, 60 parts by mass of methyl ethyl ketone and 1.2 parts by mass of a radical polymerization initiator (2,2'-azobis(2,4-dimethylvaleronitrile)) were added and mixed. It was sufficiently purged with nitrogen gas, and a mixed solution was obtained.

The mixed solution in the reactor was heated to 65° C. with stirring under a nitrogen atmosphere, and the mixed solution in the dropping funnel was dropped slowly over 3 hours.

After 2 hours at 65° C. from completion of the dropwise addition, a solution of 0.3 parts by mass of the radical polymerization initiator dissolved in 5 parts by mass of methyl ethyl ketone was added, and it was further aged at 65° C. for 2 hours and at 70° C. for 2 hours. Thereby, a polymer dispersion was obtained.

Next, by adding and stirring a predetermined amount of methyl ethyl ketone to this polymer dispersion, a polymer dispersion having a solid content of 50% by mass was obtained.

—Preparation of Resin-Coated Carbon Black Dispersion 2-2—

First, 28 g of the synthesized polymer dispersion, 40 g of carbon black (carbon black #960, manufactured by Mitsubishi Chemical Corporation), 13.6 g of a 1-mol/L potassium hydroxide solution, 20 g of methyl ethyl ketone, and 30 g of ion-exchanged water were sufficiently mixed and then kneaded using a three-roll mill. An obtained paste was added to 200 g of ion-exchanged water and sufficiently mixed, and then methyl ethyl ketone and water were distilled using an evaporator. Thereby, Resin-Coated Carbon Black Dispersion 2-2 (carbon black concentration of 20% by mass) having a 50% cumulative particle size in a volume-based particle size distribution (D50) of 68 nm was prepared.

Example 1-1

Preparation of Ink for Inkjet Recording

The following ink formulation was mixed and stirred for 30 minutes. Thereafter, its pH was adjusted to 10 by addition of aminoethylpropanediol (40-% by mass aqueous solution), and it was mixed and stirred for 30 minutes. Thereby, an ink for inkjet recording of Example 1-1 was prepared.

[Ink Formulation]

Oxidized Carbon Black Dispersion 1-1 (carbon black concentration of 20% by mass) . . . 2.0 parts by mass Resin-Coated Carbon Black Dispersion 2-1 (carbon black concentration of 20% by mass) . . . 38.0 parts by mass Glycerin . . . 5.5 parts by mass
1,3-Butanediol . . . 16.5 parts by mass
2-Ethyl-1,3-hexanediol . . . 2.0 parts by mass
Fluorosurfactant (ZONYL FS-300, manufactured by DuPont Co.; solid content of 40% by mass) . . . 2.5 parts by mass
Fluoroethylene/vinyl ether alternating copolymer (LUMIFLON FE4300, manufactured by Asahi Glass Co., Ltd.; solid content of 50% by mass; average particle diameter of 150 nm; minimum film-forming temperature (MFT) of 30° C. or less) . . . 6.0 parts by mass
Distilled water . . . 27.5 parts by mass Examples 1-2 to 9-5, 10 to 14, 19 to 20 and Comparative Examples 1 to 4, 8 to 9, 12 to 13

Preparation of Ink for Inkjet Recording

Inks for inkjet recording of Examples 1-2 to 9-5, 10 to 14, 19 to 20 and Comparative Examples 1 to 4, 8 to 9, 12 to 13 were prepared in the same manner as Example 1-1 except that Oxidized Carbon Black Dispersion 1-1 (pigment concentration of 20% by mass) in Example 1-1 was changed to Oxidized Carbon Black Dispersions 1-2 to 1-24 (all having a pigment concentration of 20% by mass) indicated in Table 2 and that the mass ratio of the oxidized carbon black CB1 and the resin-coated carbon black CB2 (CB1/CB2) was changed to those in Table 2.

Example 15

Preparation of Ink for Inkjet Recording

The following ink formulation was mixed and stirred for 30 minutes. Thereafter, its pH was adjusted to 10 by addition of aminoethylpropanediol (40-% by mass aqueous solution), and it was mixed and stirred for 30 minutes. Thereby, an ink for inkjet recording of Example 15 was prepared.
[Ink Formulation]
Oxidized Carbon Black Dispersion 1-1 (carbon black concentration of 20% by mass) . . . 4.0 parts by mass
Resin-Coated Carbon Black Dispersion 2-1 (carbon black concentration of 20% by mass) . . . 36.0 parts by mass
Glycerin . . . 5.5 parts by mass
1,3-Butanediol . . . 16.5 parts by mass
2-Ethyl-1,3-hexanediol . . . 2.0 parts by mass
Fluorosurfactant (ZONYL FS-300, manufactured by DuPont Co.; solid content of 40% by mass) . . . 2.5 parts by mass
Anionic self emulsifying ether-based polyurethane resin (W-5661, manufactured by Mitsui. Chemicals Polyurethane Inc.; solid content of 35% by mass) . . . 2.0 parts by mass
Distilled water . . . 31.5 parts by mass Example 16

Preparation of Ink for Inkjet Recording

The following ink formulation was mixed and stirred for 30 minutes. Thereafter, its pH was adjusted to 10 by addition of aminoethylpropanediol (40-% by mass aqueous solution), and it was mixed and stirred for 30 minutes. Thereby, an ink for inkjet recording of Example 16 was prepared.
[Ink Formulation]
Oxidized Carbon Black Dispersion 1-1 (carbon black concentration of 20% by mass) . . . 4.0 parts by mass
Resin-Coated Carbon Black Dispersion 2-1 (carbon black concentration of 20% by mass) . . . 36.0 parts by mass
Glycerin . . . 5.5 parts by mass
1,3-Butanediol . . . 16.5 parts by mass
2-Ethyl-1,3-hexanediol . . . 2.0 parts by mass
Fluoroethylene/vinyl ether alternating copolymer (LUMIFLON FE4300, manufactured by Asahi Glass Co., Ltd.; solid content of 50% by mass; average particle diameter of 150 nm; minimum film-forming temperature (MFT) of 30° C. or less) . . . 6.0 parts by mass
Distilled water . . . 30.0 parts by mass Example 17

Preparation of Ink for Inkjet Recording

The following ink formulation was mixed and stirred for 30 minutes. Thereafter, its pH was adjusted to 10 by addition of aminoethylpropanediol (40-% by mass aqueous solution), and it was mixed and stirred for 30 minutes. Thereby, an ink for inkjet recording of Example 17 was prepared.
[Ink Formulation]
Oxidized Carbon Black Dispersion 1-1 (carbon black concentration of 20% by mass) . . . 4.0 parts by mass
Resin-Coated Carbon Black Dispersion 2-1 (carbon black concentration of 20% by mass) . . . 36.0 parts by mass
Glycerin . . . 5.5 parts by mass
1,3-Butanediol . . . 16.5 parts by mass
2,2,4-Trimethyl-1,3-pentanediol . . . 2.0 parts by mass
Fluorosurfactant (ZONYL FS-300, manufactured by DuPont Co.; solid content of 40% by mass) . . . 2.5 parts by mass
Fluoroethylene/vinyl ether alternating copolymer (LUMIFLON FE4300, manufactured by Asahi Glass Co., Ltd.; solid content of 50% by mass; average particle diameter of 150 nm; minimum film-forming temperature (MFT) of 30° C. or less) . . . 6.0 parts by mass
Distilled water . . . 27.5 parts by mass Example 18

Preparation of Ink for Inkjet Recording

The following ink formulation was mixed and stirred for 30 minutes. Thereafter, its pH was adjusted to 10 by addition of aminoethylpropanediol (40-% by mass aqueous solution), and it was mixed and stirred for 30 minutes. Thereby, an ink for inkjet recording of Example 18 was prepared.
[Ink Formulation]
Oxidized Carbon Black Dispersion 1-1 (carbon black concentration of 20% by mass) . . . 4.0 parts by mass
Resin-Coated Carbon Black Dispersion 2-2 (carbon black concentration of 20% by mass) . . . 36.0 parts by mass
Glycerin . . . 5.5 parts by mass
1,3-Butanediol . . . 16.5 parts by mass
2-Ethyl-1,3-hexanediol . . . 2.0 parts by mass
Fluorosurfactant (ZONYL FS-300, manufactured by DuPont Co.; solid content of 40% by mass) . . . 2.5 parts by mass
Fluoroethylene/vinyl ether alternating copolymer (LUMIFLON FE4300, manufactured by Asahi Glass Co., Ltd.; solid content of 50% by mass; average particle diameter of 150 nm; minimum film-forming temperature (MFT) of 30° C. or less) . . . 6.0 parts by mass
Distilled water . . . 27.5 parts by mass

Comparative Example 5

Preparation of Ink for Inkjet Recording

The following ink formulation was mixed and stirred for 30 minutes. Thereafter, its pH was adjusted to 10 by addition of aminoethylpropanediol (40-% by mass aqueous solution), and it was mixed and stirred for 30 minutes. Thereby, an ink for inkjet recording of Comparative Example 5 was prepared.
[Ink Formulation]
  Oxidized Carbon Black Dispersion 1-2 (pigment concentration of 20% by mass) . . . 40.0 parts by mass
  Glycerin . . . 5.5 parts by mass
  1,3-Butanediol . . . 16.5 parts by mass
  2-Ethyl-1,3-hexanediol . . . 2.0 parts by mass
  Fluorosurfactant (ZONYL FS-300, manufactured by DuPont Co.; solid content of 40% by mass) . . . 2.5 parts by mass
  Fluoroethylene/vinyl ether alternating copolymer (LUMIFLON FE4300, manufactured by Asahi Glass Co., Ltd.; solid content of 50% by mass; average particle diameter of 150 nm; minimum film-forming temperature (MFT) of 30° C. or less) . . . 6.0 parts by mass
  Distilled water . . . 27.5 parts by mass

Comparative Example 6

Preparation of Ink for Inkjet Recording

An ink for inkjet recording of Comparative Example 6 was prepared in the same manner as Comparative Example 5 except that Oxidized Carbon Black Dispersion 1-2 in Comparative Example 5 was replaced by Oxidized Carbon Black Dispersion 1-5.

Comparative Example 7

Preparation of Ink for Inkjet Recording

An ink for inkjet recording of Comparative Example 7 was prepared in the same manner as Comparative Example 5 except that Oxidized Carbon Black Dispersion 1-2 in Comparative Example 5 was replaced by Oxidized Carbon Black Dispersion 1-8.

Comparative Example 10

Preparation of Ink for Inkjet Recording

The following ink formulation was mixed and stirred for 30 minutes. Thereafter, its pH was adjusted to 10 by addition of aminoethylpropanediol (40-% by mass aqueous solution), and it was mixed and stirred for 30 minutes. Thereby, an ink for inkjet recording of Comparative Example 10 was prepared.
[Ink Formulation]
  Resin-Coated Carbon Black Dispersion 2-1 (carbon black concentration of 20% by mass) . . . 40.0 parts by mass
  Glycerin . . . 5.5 parts by mass
  1,3-Butanediol . . . 16.5 parts by mass
  2-Ethyl-1,3-hexanediol . . . 2.0 parts by mass
  Fluorosurfactant (ZONYL FS-300, manufactured by DuPont Co.; solid content of 40% by mass) . . . 2.5 parts by mass
  Fluoroethylene/vinyl ether alternating copolymer (LUMIFLON FE4300, manufactured by Asahi Glass Co., Ltd.; solid content of 50% by mass; average particle diameter of 150 nm; minimum film-forming temperature (MFT) of 30° C. or less) . . . 6.0 parts by mass
  Distilled water . . . 27.5 parts by mass

Comparative Example 11

Preparation of Ink for Inkjet Recording

The following ink formulation was mixed and stirred for 30 minutes. Thereafter, its pH was adjusted to 10 by addition of aminoethylpropanediol (40-% by mass aqueous solution), and it was mixed and stirred for 30 minutes. Thereby, an ink for inkjet recording of Comparative Example 11 was prepared.
[Ink Formulation]
  Oxidized Carbon Black Dispersion 1-1 (carbon black concentration of 20% by mass) . . . 4.0 parts by mass
  Resin-Coated Carbon Black Dispersion 2-1 (carbon black concentration of 20% by mass) . . . 36.0 parts by mass
  Glycerin . . . 5.5 parts by mass
  1,3-Butanediol . . . 16.5 parts by mass
  Fluorosurfactant (ZONYL FS-300, manufactured by DuPont Co.; solid content of 40% by mass) . . . 2.5 parts by mass
  Fluoroethylene/vinyl ether alternating copolymer (LUMIFLON FE4300, manufactured by Asahi Glass Co., Ltd.; solid content of 50% by mass; average particle diameter of 150 nm; minimum film-forming temperature (MFT) of 30° C. or less) . . . 6.0 parts by mass
  Distilled water . . . 29.5 parts by mass Next, inks for inkjet recording prepared in the examples and comparative examples were evaluated for storage stability as follows. Results are shown in Table 3.
<Storage Stability of Ink>

After a viscosity (initial viscosity, of each ink was measured immediately after the respective Preparation of ink for inkjet recording, 50 g of the ink was placed and sealed in a sample vial (SV-50, manufactured by Nichiden Rika Glass Co., Ltd.). It was stored for four (4) weeks in an environment at 70° C., and then the viscosity (viscosity after storage, $\mu_{after\ storage}$) was measured. These viscosity values were applied to the following formula to calculate a viscosity change rate, and storage stability of the ink was evaluated based on the following criteria. Here, the viscosity was measured using a viscometer (RE500, manufactured by Toyo Seiki Seisaku-Sho Co., Ltd.).

Viscosity change rate (%)=$[(\mu_{after\ storage}-\mu_{initial})/\mu_{initial}]\times 100$

[Evaluation Criteria]
  A: The viscosity change rate was less than 5% (most favorable)
  B: The viscosity change rate was 5% or greater and less than 10% (favorable)
  BC: The viscosity change rate was 10% or greater and less than 15% (no problem in practical use)
  C: The viscosity change rate was 15% or greater and less than 20% (problem in practical use)
  D: The viscosity change rate was 20% or greater (problem in practical use)

Next, each of the inks for inkjet recording of the examples and comparative examples thus prepared was filled in an ink cartridge. It was then mounted on an inkjet printer illustrated in FIG. 3 and FIG. 4 (IPSIO GX5000, manufactured by Ricoh Company, Ltd.), and a printing experiment was carried out. Then, image density on plain paper, image density on gloss paper, image bleeding and discharge stability were evaluated as follows. Results are shown in Table 3.

<Image Density>

Printing was carried out on plain paper (PPC paper 4024, manufactured by Fuji Xerox Co., Ltd.; non-smooth paper, having a smoothness of 62 seconds) and gloss paper (MC gloss paper, manufactured by Seiko Epson Corporation; smooth paper, having a smoothness of 350 seconds) using an inkjet printer illustrated in FIG. 3 and FIG. 4 (IPSIO GX5000, manufactured by Ricoh Company, Ltd.). Image density of a solid image of an image sample was measured using a spectrodensitometer (XRITE 938, manufactured by Xrite) and evaluated based on the following criteria.

Here, the smoothness was measured using an Oken type smoothness and air-permeability tester (manufactured by Kumagai Riki Kogyo Co., Ltd.).

[Evaluation Criteria of Image Density on Plain Paper]
A: 1.31 or greater
B: 1.21 to 1.30
BC: 1.11 to 1.20
C: 1.01 to 1.10
D: 1.00 or less

[Evaluation Criteria of Image Density on Gloss Paper]
A: 1.81 or greater
B: 1.71 to 1.80
BC: 1.61 to 1.70
C: 1.51 to 1.60
D: 1.50 or less <Image Bleeding>

Regarding the image bleeding, a degree of bleeding at an outline (edge portion) of a printed image portion was visually observed, and the degree of bleeding was evaluated based on the following criteria. Here, an image without bleeding is a high-quality image with the image portion sharp and vivid.

[Evaluation Criteria]
A: There was no image bleeding, and a high-quality image was obtained.
B: Slight image bleeding was observed, but image quality was favorable.
C: Significant image bleeding was observed, and image quality was poor.
D: Severe image bleeding was observed, and image quality was extremely poor.

<Discharge Stability>

Printing was carried out using an inkjet printer illustrated in FIG. 3 and FIG. 4 (IPSIO GX5000, manufactured by Ricoh Company, Ltd.). Then, the printer was left to stand in an environment with a temperature of 50° C. and a humidity of 40% RH for two (2) months with a recording head of the printer capped. Whether or not a cleaning operation could restore a discharge condition of the printer after standing to an initial discharge condition was evaluated based on the following evaluation criteria. Here, the cleaning operation means carrying out a head cleaning.

[Evaluation Criteria]
A: Printing could be carried out with no cleaning operation.
B: The discharge condition was restored with the cleaning operation carried out once for printing.
BC: The discharge condition was restored with the cleaning operation carried out twice for printing.
C: The discharge condition was restored with the cleaning operation carried out three times for printing.
D: The discharge condition could not be restored even with the cleaning operation carried out three or more times.

TABLE 2

| | Oxidized Carbon Black CB1 Dispersion No. | Resin-Coated Carbon Black CB2 Dispersion No. | Mass ratio (CB1/CB2) | Average particle diameter (D50) of carbon black in ink (nm) |
|---|---|---|---|---|
| Example 1-1 | 1-1 | 2-1 | 5/95 | 95 |
| Example 1-2 | 1-1 | 2-1 | 10/90 | 93 |
| Example 1-3 | 1-1 | 2-1 | 25/75 | 95 |
| Example 1-4 | 1-1 | 2-1 | 50/50 | 92 |
| Example 1-5 | 1-1 | 2-1 | 55/45 | 93 |
| Example 2-1 | 1-2 | 2-1 | 5/95 | 110 |
| Example 2-2 | 1-2 | 2-1 | 10/90 | 113 |
| Example 2-3 | 1-2 | 2-1 | 25/75 | 115 |
| Example 2-4 | 1-2 | 2-1 | 50/50 | 115 |
| Example 2-5 | 1-2 | 2-1 | 55/45 | 116 |
| Example 3-1 | 1-3 | 2-1 | 5/95 | 99 |
| Example 3-2 | 1-3 | 2-1 | 10/90 | 101 |
| Example 3-3 | 1-3 | 2-1 | 25/75 | 102 |
| Example 3-4 | 1-3 | 2-1 | 50/50 | 100 |
| Example 3-5 | 1-3 | 2-1 | 55/45 | 102 |
| Example 4-1 | 1-4 | 2-1 | 5/95 | 95 |
| Example 4-2 | 1-4 | 2-1 | 10/90 | 95 |
| Example 4-3 | 1-4 | 2-1 | 25/75 | 97 |
| Example 4-4 | 1-4 | 2-1 | 50/50 | 98 |
| Example 4-5 | 1-4 | 2-1 | 55/45 | 97 |
| Example 5-1 | 1-5 | 2-1 | 5/95 | 121 |
| Example 5-2 | 1-5 | 2-1 | 10/90 | 122 |
| Example 5-3 | 1-5 | 2-1 | 25/75 | 120 |
| Example 5-4 | 1-5 | 2-1 | 50/50 | 120 |
| Example 5-5 | 1-5 | 2-1 | 55/45 | 121 |
| Example 6-1 | 1-6 | 2-1 | 5/95 | 113 |
| Example 6-2 | 1-6 | 2-1 | 10/90 | 115 |
| Example 6-3 | 1-6 | 2-1 | 25/75 | 111 |
| Example 6-4 | 1-6 | 2-1 | 50/50 | 112 |
| Example 6-5 | 1-6 | 2-1 | 55/45 | 113 |
| Example 7-1 | 1-7 | 2-1 | 5/95 | 93 |
| Example 7-2 | 1-7 | 2-1 | 10/90 | 92 |
| Example 7-3 | 1-7 | 2-1 | 25/75 | 95 |
| Example 7-4 | 1-7 | 2-1 | 50/50 | 94 |
| Example 7-5 | 1-7 | 2-1 | 55/45 | 92 |
| Example 8-1 | 1-8 | 2-1 | 5/95 | 117 |
| Example 8-2 | 1-8 | 2-1 | 10/90 | 118 |
| Example 8-3 | 1-8 | 2-1 | 25/75 | 116 |
| Example 8-4 | 1-8 | 2-1 | 50/50 | 116 |
| Example 8-5 | 1-8 | 2-1 | 55/45 | 117 |
| Example 9-1 | 1-9 | 2-1 | 5/95 | 105 |
| Example 9-2 | 1-9 | 2-1 | 10/90 | 106 |
| Example 9-3 | 1-9 | 2-1 | 25/75 | 104 |
| Example 9-4 | 1-9 | 2-1 | 50/50 | 105 |
| Example 9-5 | 1-9 | 2-1 | 55/45 | 106 |
| Example 10 | 1-10 | 2-1 | 10/90 | 94 |
| Example 11 | 1-11 | 2-1 | 10/90 | 95 |
| Example 12 | 1-12 | 2-1 | 10/90 | 93 |
| Example 13 | 1-13 | 2-1 | 10/90 | 95 |
| Example 14 | 1-14 | 2-1 | 10/90 | 94 |
| Example 15 | 1-1 | 2-1 | 10/90 | 93 |
| Example 16 | 1-1 | 2-1 | 10/90 | 93 |
| Example 17 | 1-1 | 2-1 | 10/90 | 93 |
| Example 18 | 1-1 | 2-2 | 10/90 | 93 |
| Example 19 | 1-23 | 2-1 | 10/90 | 81 |
| Example 20 | 1-24 | 2-1 | 10/90 | 162 |
| Comparative Example 1 | 1-15 | 2-1 | 10/90 | 95 |
| Comparative Example 2 | 1-16 | 2-1 | 10/90 | 94 |
| Comparative Example 3 | 1-17 | 2-1 | 10/90 | 92 |
| Comparative Example 4 | 1-18 | 2-1 | 10/90 | 96 |
| Comparative Example 5 | 1-2 | — | 100/0 | 113 |
| Comparative Example 6 | 1-5 | — | 100/0 | 109 |
| Comparative Example 7 | 1-8 | — | 100/0 | 118 |
| Comparative Example 8 | 1-19 | 2-1 | 10/90 | 98 |
| Comparative Example 9 | 1-20 | 2-1 | 10/90 | 99 |

TABLE 2-continued

| | Oxidized Carbon Black CB1 Dispersion No. | Resin-Coated Carbon Black CB2 Dispersion No. | Mass ratio (CB1/CB2) | Average particle diameter (D50) of carbon black in ink (nm) |
|---|---|---|---|---|
| Comparative Example 10 | — | 2-1 | 0/100 | 87 |
| Comparative Example 11 | 1-1 | 2-1 | 10/90 | 93 |
| Comparative Example 12 | 1-21 | 2-1 | 10/90 | 93 |
| Comparative Example 13 | 1-22 | 2-1 | 10/90 | 95 |

TABLE 3

| | Evaluation results | | | | |
|---|---|---|---|---|---|
| | Image density on plain paper | Image density on gloss paper | Image bleeding | Storage stability of ink | Discharge stability |
| Example 1-1 | B | BC | B | BC | B |
| Example 1-2 | B | B | B | B | B |
| Example 1-3 | B | B | B | B | B |
| Example 1-4 | B | B | B | B | B |
| Example 1-5 | B | BC | B | BC | B |
| Example 2-1 | B | BC | B | BC | B |
| Example 2-2 | B | B | B | B | B |
| Example 2-3 | B | B | B | B | B |
| Example 2-4 | B | B | B | B | B |
| Example 2-5 | B | BC | B | BC | B |
| Example 3-1 | B | BC | B | BC | B |
| Example 3-2 | B | B | B | B | B |
| Example 3-3 | B | B | B | B | B |
| Example 3-4 | B | B | B | B | B |
| Example 3-5 | B | BC | B | BC | B |
| Example 4-1 | B | BC | B | BC | B |
| Example 4-2 | B | B | B | B | B |
| Example 4-3 | B | B | B | B | B |
| Example 4-4 | B | B | B | B | B |
| Example 4-5 | B | BC | B | BC | B |
| Example 5-1 | B | BC | B | BC | B |
| Example 5-2 | B | B | B | B | B |
| Example 5-3 | B | B | B | B | B |
| Example 5-4 | B | B | B | B | B |
| Example 5-5 | B | BC | B | BC | B |
| Example 6-1 | B | BC | B | BC | B |
| Example 6-2 | B | B | B | B | B |
| Example 6-3 | B | B | B | B | B |
| Example 6-4 | B | B | B | B | B |
| Example 6-5 | B | BC | B | BC | B |
| Example 7-1 | B | BC | B | BC | B |
| Example 7-2 | B | B | B | B | B |
| Example 7-3 | B | B | B | B | B |
| Example 7-4 | B | B | B | B | B |
| Example 7-5 | B | BC | B | BC | B |
| Example 8-1 | B | BC | B | BC | B |
| Example 8-2 | B | B | B | B | B |
| Example 8-3 | B | B | B | B | B |
| Example 8-4 | B | B | B | B | B |
| Example 8-5 | B | BC | B | BC | B |
| Example 9-1 | B | BC | B | BC | B |
| Example 9-2 | B | B | B | B | B |
| Example 9-3 | B | B | B | B | B |
| Example 9-4 | B | B | B | B | B |
| Example 9-5 | B | BC | B | BC | B |
| Example 10 | B | B | B | B | B |
| Example 11 | B | A | A | A | A |
| Example 12 | A | A | A | A | A |
| Example 13 | A | A | A | A | A |
| Example 14 | A | A | A | A | A |
| Example 15 | B | B | B | A | A |
| Example 16 | BC | BC | B | B | B |
| Example 17 | B | B | B | B | B |
| Example 18 | B | B | B | B | B |
| Example 19 | BC | BC | B | C | C |
| Example 20 | BC | C | C | BC | BC |
| Comparative Example 1 | BC | BC | B | BC | B |
| Comparative Example 2 | BC | BC | B | BC | B |
| Comparative Example 3 | C | C | B | C | BC |
| Comparative Example 4 | BC | BC | B | C | C |
| Comparative Example 5 | B | C | D | B | B |
| Comparative Example 6 | B | C | D | B | B |
| Comparative Example 7 | B | C | D | B | B |
| Comparative Example 8 | D | D | D | D | B |
| Comparative Example 9 | D | D | D | D | B |
| Comparative Example 10 | C | C | B | C | B |
| Comparative Example 11 | B | BC | B | B | B |
| Comparative Example 12 | BC | BC | B | BC | B |
| Comparative Example 13 | BC | BC | B | BC | B |

It was found from the results in Table 3 that the inks of Examples 1-1 to 11 and 15 to 20 provide high image density on both non-smooth paper (plain paper) and smooth paper (gloss paper), cause no image bleeding and provide superior storage stability and discharge stability of the inks.

It was also found that the inks of Examples 12 to 14 with the alkali metal hydroxide included in the ozone-oxidized carbon black dispersions as basic compounds provide favorable storage stability of the inks and further improve image density significantly.

Aspects of the present invention are as follows.

<1> An ink for inkjet recording, including:
a pigment;
a penetrating agent; and
water,
wherein the pigment includes:
an ozone-oxidized carbon black, including carbon black oxidized by ozone and having a volatile matter content of the carbon black of 10% by mass to 20% by mass and a BET specific surface area of 90 m$^2$/g to 150 m$^2$/g; and
a resin-coated carbon black, including: carbon black; and a resin present on a surface of the carbon black.

<2> The ink for inkjet recording according to <1>, wherein a mass ratio (CB1:CB2) of the ozone-oxidized carbon black CB1 and the resin-coated carbon black CB2 of 10:90 to 50:50.

<3> The ink for inkjet recording according to <1> or <2>, wherein the ink has a 50% cumulative particle size in a volume-based particle size distribution (D50) of the ozone-oxidized carbon black and the resin-coated carbon black of 90 nm to 150 nm.

<4> The ink for inkjet recording according to any one of <1> to <3>, wherein the ink includes an ozone-oxidized carbon black dispersion including the ozone-oxidized carbon black, and the ozone-oxidized carbon black dispersion includes a basic compound.

<5> The ink for inkjet recording according to <4>, wherein the basic compound is alkali metal hydroxide, and the alkali metal hydroxide is lithium hydroxide, sodium hydroxide or potassium hydroxide, or any combination thereof.

<6> The ink for inkjet recording according to any one of <1> to <5>, wherein the penetrating agent is 2-ethyl-1,3-hexanediol or 2,2,4-trimethyl-1,3-pentanediol.

<7> The ink for inkjet recording according to any one of <1> to <6>, wherein the ink further includes an anionic self-emulsifying ether-based polyurethane resin.

<8> The ink for inkjet recording according to any one of <1> to <7>, wherein the ink further includes a fluorosurfactant.

<9> An ink cartridge, including a container, wherein the ink for inkjet recording according to any one of <1> to <8> is contained in the container.

<10> An inkjet recording apparatus, including: an ink-flying unit, configured to apply an impulse on the ink for inkjet recording according to any one of <1> to <8> to fly the ink for inkjet recording so as to record an image.

This application claims priority to Japanese application No. 2012-164906, filed on Jul. 25, 2012 and incorporated herein by reference.

What is claimed is:

1. An ink, comprising:
a pigment,
a penetrating agent selected from the group consisting of 2-ethyl-1,3-hexanediol and 2,2,4-trimethyl-1,3-pentanediol, and
water,
wherein the pigment comprises:
an ozone-oxidized carbon black, comprising carbon black oxidized by ozone and having a volatile matter content of the carbon black of 10% by mass to 20% by mass and a BET specific surface area of 90 $m^2/g$ to 150 $m^2/g$; and
a resin-coated carbon black, comprising: carbon black; and a resin present on a surface of the carbon black.

2. The ink according to claim 1,
wherein a mass ratio (CB1:CB2) of the ozone-oxidized carbon black CB1 and the resin-coated carbon black CB2 is in a range of 10:90 to 50:50.

3. The ink according to claim 1,
wherein the ink has a 50% cumulative particle size in a volume-based particle size distribution (D50) of the ozone-oxidized carbon black and the resin-coated carbon black of 90 nm to 150 nm.

4. The ink according to claim 1,
wherein the ink comprises an ozone-oxidized carbon black dispersion comprising the ozone-oxidized carbon black, and the ozone-oxidized carbon black dispersion comprises a basic compound.

5. The ink according to claim 4,
wherein the basic compound is at least one alkali metal hydroxide selected from the group consisting of lithium hydroxide, sodium hydroxide and potassium hydroxide.

6. The ink according to claim 1,
wherein the ink further comprises an anionic self-emulsifying ether-based polyurethane resin.

7. The ink according to claim 1,
wherein the ink further comprises a fluorosurfactant.

8. An ink cartridge, comprising:
a container,
wherein an ink is contained in the container,
wherein the ink comprises:
a pigment,
a penetrating agent selected from the group consisting of 2-ethyl-1,3-hexanediol and 2,2,4-trimethyl-1,3-pentanediol, and
water,
wherein the pigment comprises:
an ozone-oxidized carbon black, comprising carbon black oxidized by ozone and having a volatile matter content of the carbon black of 10% by mass to 20% by mass and a BET specific surface area of 90 $m^2/g$ to 150 $m^2/g$; and
a resin-coated carbon black, comprising: carbon black; and a resin present on a surface of the carbon black.

9. An inkjet recording apparatus, comprising:
an ink-flying unit, configured to apply an impulse on an ink to fly the ink so as to record an image,
wherein the ink comprises:
a pigment,
a penetrating agent selected from the group consisting of 2-ethyl-1,3-hexanediol and 2,2,4-trimethyl-1,3-pentanediol, and
water,
wherein the pigment comprises:
an ozone-oxidized carbon black, comprising carbon black oxidized by ozone and having a volatile matter content of the carbon black of 10% by mass to 20% by mass and a BET specific surface area of 90 $m^2/g$ to 150 $m^2/g$; and
a resin-coated carbon black, comprising: carbon black; and a resin present on a surface of the carbon black.

10. The ink according to claim 1, wherein the penetrating agent is 2-ethyl-1,3-hexanediol.

11. The ink according to claim 1, wherein the penetrating agent is 2,2,4-trimethyl-1,3-pentanediol.

12. The ink cartridge according to claim 8, wherein the penetrating agent is 2-ethyl-1,3-hexanediol.

13. The ink cartridge according to claim 8, wherein the penetrating agent is 2,2,4-trimethyl-1,3-pentanediol.

14. The inkjet recording apparatus according to claim 9, wherein the penetrating agent is 2-ethyl-1,3-hexanediol.

15. The inkjet recording apparatus according to claim 9, wherein the penetrating agent is 2,2,4-trimethyl-1,3-pentanediol.

* * * * *